(12) United States Patent
Matsumura et al.

(10) Patent No.: US 11,272,484 B2
(45) Date of Patent: Mar. 8, 2022

(54) RADIO BASE STATION AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 105 days.

(21) Appl. No.: 16/617,972

(22) PCT Filed: May 31, 2017

(86) PCT No.: PCT/JP2017/020362
§ 371 (c)(1),
(2) Date: Nov. 27, 2019

(87) PCT Pub. No.: WO2018/220772
PCT Pub. Date: Dec. 6, 2018

(65) Prior Publication Data
US 2020/0170005 A1 May 28, 2020

(51) Int. Cl.
*H04W 72/04* (2009.01)
*H04L 1/18* (2006.01)
(Continued)

(52) U.S. Cl.
CPC ........ *H04W 72/0413* (2013.01); *H04L 1/1812* (2013.01); *H04L 27/2605* (2013.01); *H04L 5/0007* (2013.01)

(58) Field of Classification Search
CPC ......... H04W 72/0413; H04W 72/1284; H04W 72/042; H04W 72/044; H04L 1/1812;
(Continued)

(56) References Cited

U.S. PATENT DOCUMENTS 8,385,459 B2 * 2/2013 Ogawa .................... H04L 7/042
375/295
8,929,308 B2 1/2015 Ahn et al.
(Continued)

FOREIGN PATENT DOCUMENTS

JP 2006-520109 A 8/2006
WO 2016-031115 A1 3/2016

OTHER PUBLICATIONS

Extended European Search Report issued in counterpart European Patent Application No. 17911844.3, dated Dec. 8, 2020 (8 pages).
(Continued)

*Primary Examiner* — Hanh N Nguyen
(74) *Attorney, Agent, or Firm* — Osha Bergman Watanabe & Burton LLP

(57) ABSTRACT

According to the present invention, UL control information can be reported properly in future radio communication systems. According to one aspect of the present invention, a radio base station includes a transmission section that transmits candidate set information that indicates a plurality of amounts of phase rotation that are associated respectively with a plurality of candidate values of UCI, a control section that controls judgement of the UCI value based on the UL signal, and the plurality of amounts of phase rotations are provided at regular intervals.

7 Claims, 26 Drawing Sheets

(51) Int. Cl.
*H04L 27/26* (2006.01)
*H04L 5/00* (2006.01)

(58) Field of Classification Search
CPC . H04L 27/2605; H04L 5/0007; H04L 5/0091; H04L 5/0053; H04L 1/1854; H04L 1/1861; H04L 5/0042; H04L 27/06
See application file for complete search history.

(56) References Cited

U.S. PATENT DOCUMENTS

| | | | |
|---|---|---|---|
| 9,357,532 B2* | 5/2016 | Papasakellariou | H04W 72/042 |
| 10,512,070 B2* | 12/2019 | Shao | H04W 72/04 |
| 2003/0128658 A1 | 7/2003 | Walton et al. | |
| 2013/0148617 A1* | 6/2013 | Park | H04L 1/1692 370/329 |
| 2017/0156138 A1 | 6/2017 | Yamamoto et al. | |
| 2019/0007175 A1* | 1/2019 | Kwak | H04L 5/0048 |

OTHER PUBLICATIONS

International Search Report issued in Application No. PCT/JP2017/020362, dated Aug. 1, 2017 (4 pages).
Written Opinion issued in International Application No. PCT/JP2017/020362, dated Aug. 1, 2017 (4 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting #88; R1-1702811; "DMRS-based vs. Sequence-based PUCCH in short duration;" NTT DOCOMO, Inc.; Feb. 13-17, 2017; Athens, Greece (9 pages).
Office Action issued in the counterpart Japanese Patent Application No. 2019-521622, dated Apr. 27, 2021 (6 pages).
LG Electronics; "sPUCCH design for HARQ-ACK feedback with shortened TTI length"; 3GPP TSG RAN WG1 Meeting #86, R1-166860; Gothenburg, Sweden; Aug. 22-26, 2016 (7 pages).
Panasonic; "Ordering of the implicit resource allocation table for Uplink ACK/NACK"; 3GPP TSG RAN WG1 Meeting #51, R1-074918; Jeju, Korea; Nov. 5-9, 2007 (4 pages).

* cited by examiner

CYCLIC SHIFT CANDIDATE SET
FOR POSITIVE SR

CYCLIC SHIFT CANDIDATE SET
FOR NEGATIVE SR

NEGATIVE SR

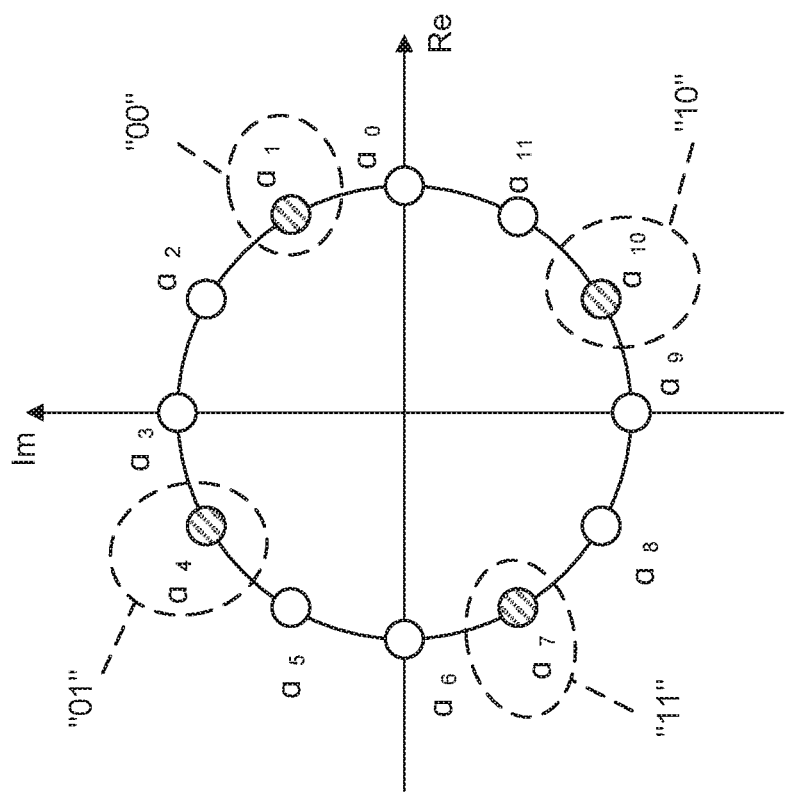
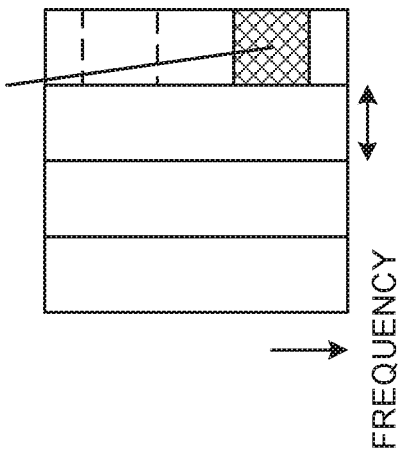
FIG. 7A
POSITIVE SR
FIG. 7B

FREQUENCY RESOURCE ALLOCATION PATTERN #1

FREQUENCY RESOURCE ALLOCATION PATTERN #2

POSITIVE SR

NEGATIVE SR

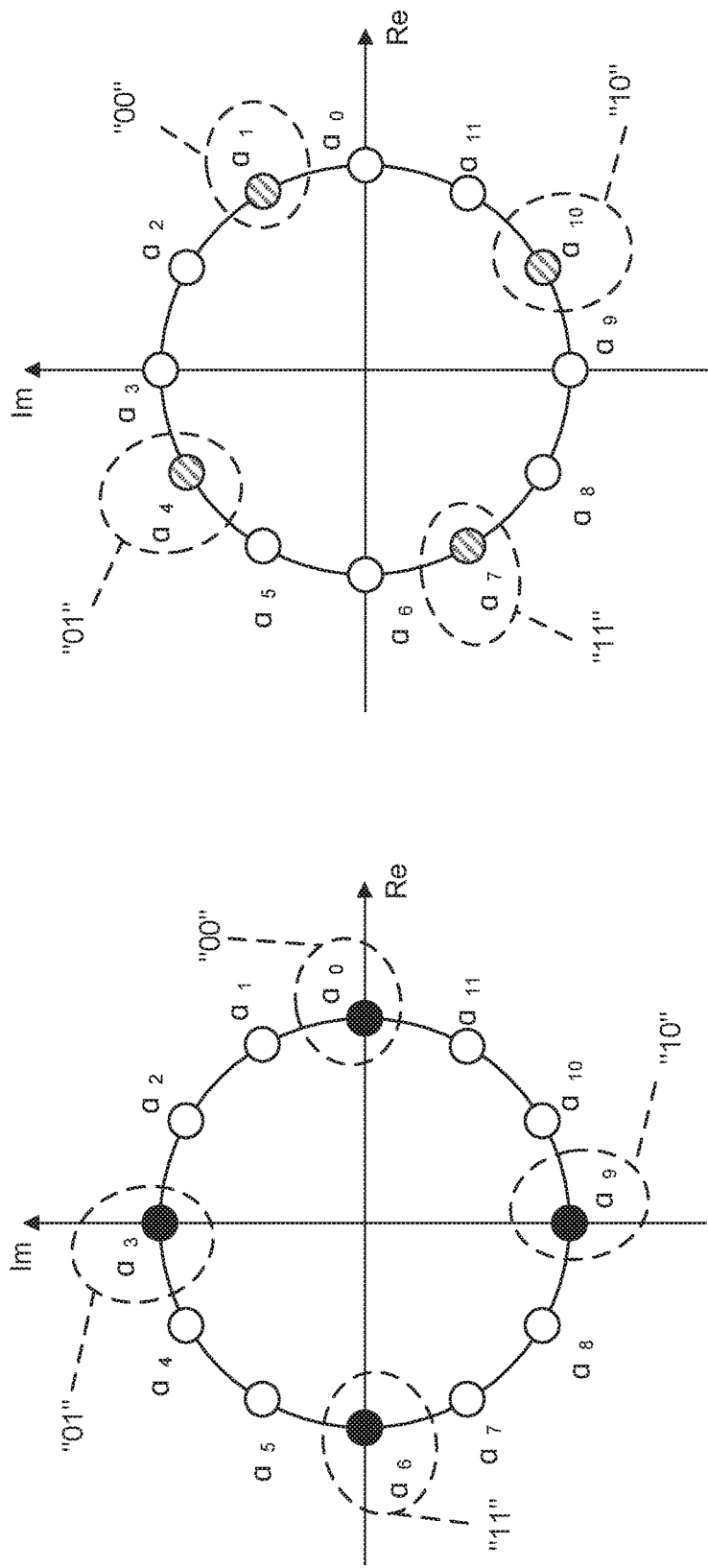

POSITIVE SR

NEGATIVE SR

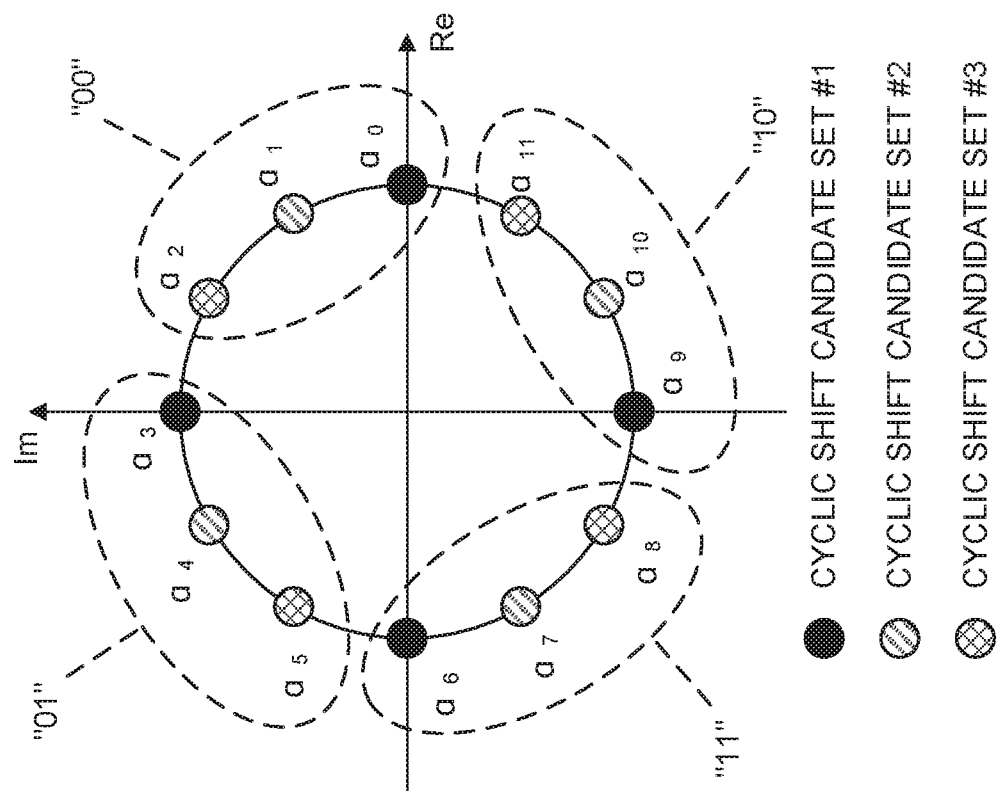
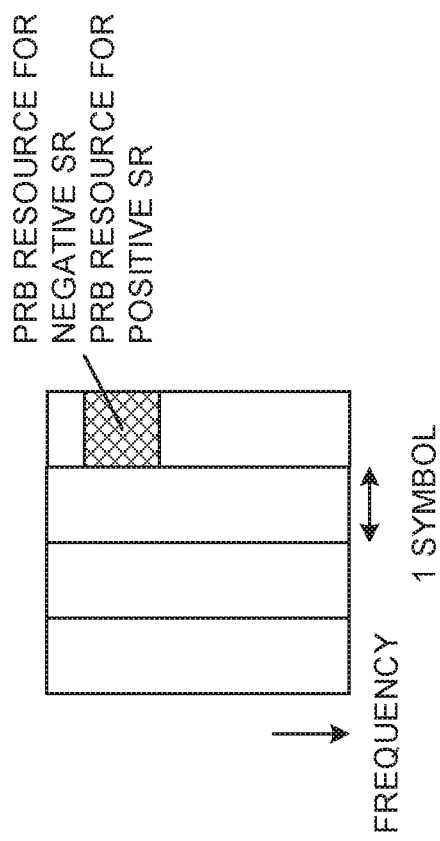

FIG. 17A  POSITIVE SR

→ RE INDEX

| CYCLIC SHIFT INDEX ↓ | 0 | 1 | 2 | 3 | 4 | 5 | 6 | 7 | 8 | 9 | 10 | 11 |
|---|---|---|---|---|---|---|---|---|---|---|---|---|
| 0 | 0.707 −0.707i | 0.707 +0.707i | −0.707 −0.707i | −0.707 −0.707i | −0.707 −0.707i | −0.707 −0.707i | 0.707 +0.707i | 0.707 +0.707i | −0.707 +0.707i | −0.707 −0.707i | −0.707 −0.707i | −0.707 +0.707i |
| 3 | 0.707 −0.707i | −0.707 +0.707i | 0.707 −0.707i | −0.707 −0.707i | −0.707 −0.707i | −0.707 −0.707i | −0.707 −0.707i | −0.707 +0.707i | −0.707 +0.707i | −0.707 −0.707i | 0.707 +0.707i | 0.707 +0.707i |
| 6 | 0.707 −0.707i | −0.707 −0.707i | 0.707 −0.707i | 0.707 +0.707i | −0.707 +0.707i | −0.707 −0.707i | 0.707 −0.707i | −0.707 −0.707i | −0.707 +0.707i | −0.707 −0.707i | 0.707 +0.707i | 0.707 −0.707i |
| 9 | 0.707 −0.707i | 0.707 −0.707i | 0.707 +0.707i | 0.707 +0.707i | −0.707 +0.707i | −0.707 +0.707i | 0.707 +0.707i | −0.707 +0.707i | −0.707 +0.707i | 0.707 −0.707i | −0.707 −0.707i | −0.707 +0.707i |

FIG. 17B  NEGATIVE SR

→ RE INDEX

| CYCLIC SHIFT INDEX ↓ | 0 | 1 | 2 | 3 | 4 | 5 | 6 | 7 | 8 | 9 | 10 | 11 |
|---|---|---|---|---|---|---|---|---|---|---|---|---|
| 1 | 0.707 −0.707i | 0.259 +0.966i | −0.966 −0.259i | 0.707 −0.707i | −0.259 −0.966i | 0.259 −0.966i | −0.707 −0.707i | −0.259 −0.966i | 0.966 +0.259i | 0.707 −0.707i | −0.966 +0.259i | −0.259 +0.966i |
| 4 | 0.707 −0.707i | −0.966 +0.259i | 0.966 −0.259i | −0.707 −0.707i | −0.259 −0.966i | 0.966 +0.259i | −0.707 −0.707i | −0.966 +0.259i | 0.966 +0.259i | 0.707 +0.707i | 0.966 −0.259i | 0.966 +0.259i |
| 7 | 0.707 −0.707i | −0.259 −0.966i | 0.966 −0.259i | −0.707 +0.707i | −0.259 −0.966i | −0.259 +0.966i | −0.707 +0.707i | 0.259 +0.966i | 0.966 +0.259i | −0.707 +0.707i | −0.966 −0.259i | 0.259 −0.966i |
| 10 | 0.707 −0.707i | 0.966 −0.259i | 0.966 +0.259i | 0.707 +0.707i | −0.259 −0.966i | −0.966 −0.259i | 0.707 +0.707i | 0.966 −0.259i | 0.966 +0.259i | −0.707 −0.707i | 0.966 −0.259i | −0.966 −0.259i |

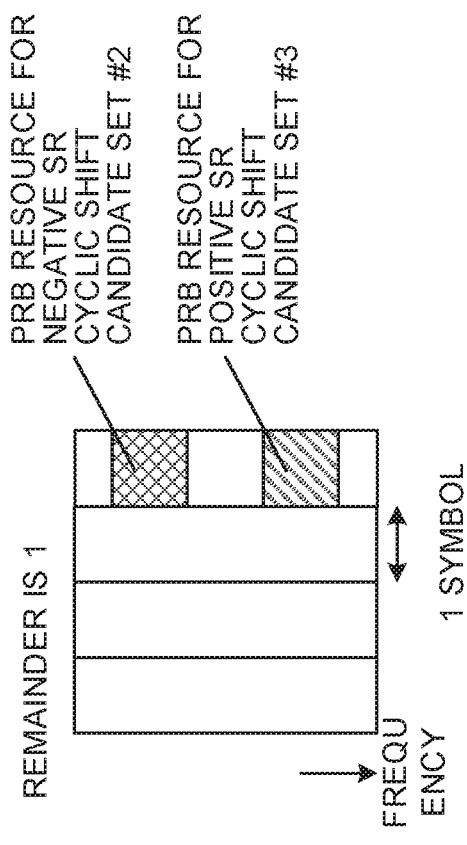
FIG. 18A
FIG. 18B
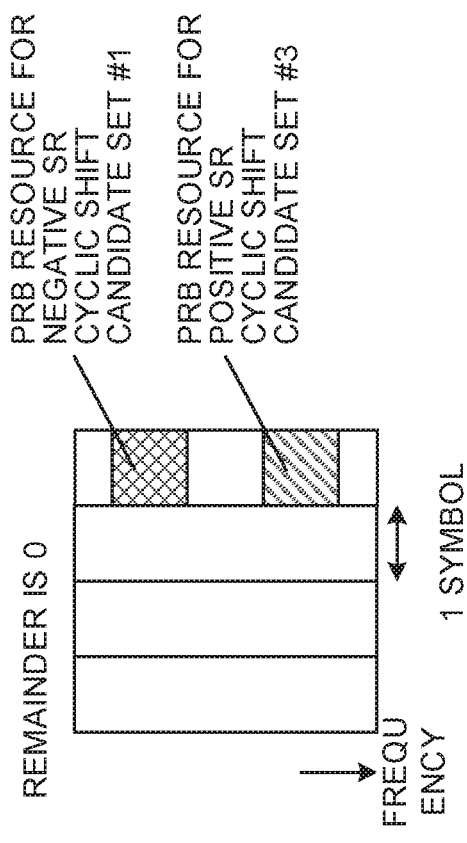
FIG. 18C
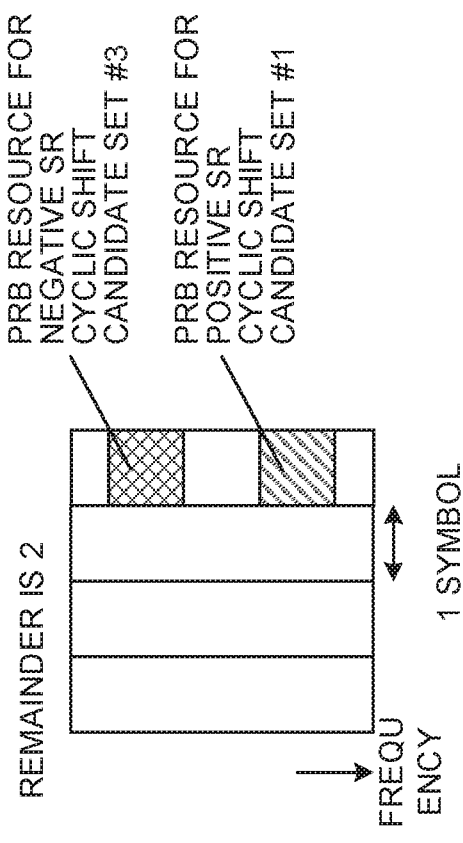

FIG. 20

| PDCCH FORMAT | NUMBER OF CCES | NUMBER OF REGS | NUMBER OF PDCCH BITS | AGGREGATION LEVEL |
|---|---|---|---|---|
| 0 | 1 | 9 | 72 | 1 |
| 1 | 2 | 18 | 144 | 2 |
| 2 | 4 | 36 | 288 | 4 |
| 3 | 8 | 72 | 576 | 8 |

RADIO BASE STATION AND RADIO COMMUNICATION METHOD

TECHNICAL FIELD

The present invention relates to a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting 1 channel-encoded data packet, and serve as the unit of processing in, for example, scheduling, link adaptation, retransmission control (HARQ (Hybrid Automatic Repeat reQuest)) and so on.

Also, in existing LTE systems (for example, LTE Rel. 8 to 13), a user terminal (UE (User Equipment)) transmits uplink control information (UCI) by using a UL control channel (for example, PUCCH (Physical Uplink Control CHannel)) and/or a UL data channel (for example, PUSCH (Physical Uplink Shared CHannel)). The format of this UL control channel is referred to as "PUCCH format" and so on.

UCI includes at least one of a scheduling request (SR), retransmission control information in response to DL data (DL data channel (PDSCH (Physical Downlink Shared CHannel))) (also referred to as "HARQ-ACK (Hybrid Automatic Repeat reQuest-ACKnowledgement)," "ACK," "NACK (Negative ACK)" and so on) and channel state information (CSI).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, 5G, NR, etc.) are expected to realize various radio communication services so as to fulfill varying requirements (for example, ultra-high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Furthermore, in LTE/NR, studies are underway to use UL control channels of various formats (UL control channel formats). When applying UCI transmission methods in existing LTE systems (LTE Rel. 13 or earlier versions) to such future radio communication systems, there is a risk that the coverage, throughput and/or others may deteriorate.

The present invention has been made in view of the above, and it is therefore an object of the present invention to provide a radio base station and a radio communication method, whereby UL control information can be reported properly in future radio communication systems.

Solution to Problem

According to one aspect of the present invention, a radio base station includes a transmission section that transmits candidate set information that indicates a plurality of amounts of phase rotation that are associated respectively with a plurality of candidate values of UCI, a receiving section that receives a UL signal that is transmitted by using an amount of phase rotation associated with a UCI value based on the candidate set information, and a control section that controls judgement of the UCI value based on the UL signal, and the plurality of amounts of phase rotations are provided at regular intervals.

Advantageous Effects of Invention

According to the present invention, UL control information can be reported properly in future radio communication systems.

BRIEF DESCRIPTION OF DRAWINGS

FIGS. 7A and 7B are diagrams to show examples of resources for positive SR reporting;

FIGS. 10A and 10B are diagrams to show cyclic shift candidate set allocation pattern #2;

FIGS. 12A and 12B are diagrams to show examples of methods of selecting cyclic shift candidate sets for the second SR reporting method;

FIGS. 17A and 17B are diagrams to show examples of transmission signal sequence values of sequence-based PUCCH;

FIGS. 18A to 18C are diagrams to show examples of selection methods based on remainders of CCE indices;

FIG. 20 is a diagram to show examples of parameters related to PUCCH formats;

DESCRIPTION OF EMBODIMENTS

Figure 1A:
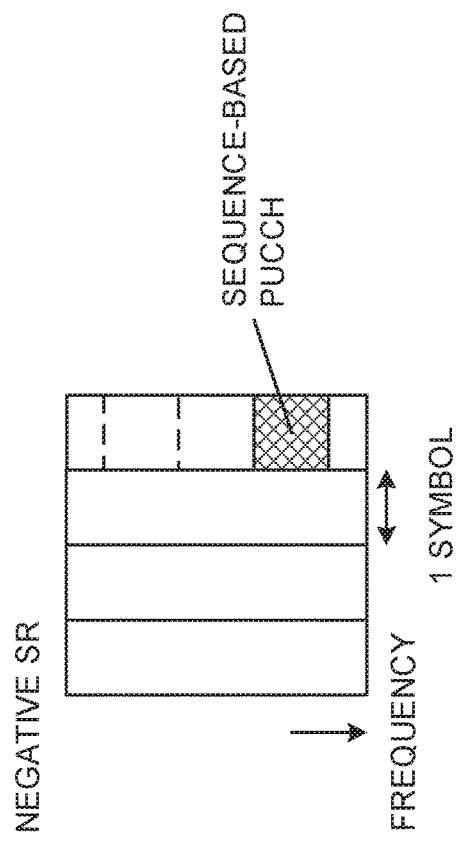
FIGS. 1A and 1B are diagrams to show examples of first SR reporting methods.

Future radio communication systems (for example, LTE Rel. 14, 15 and/or later versions, 5G, NR, etc.) are under study to introduce multiple numerologies, not a single numerology.

Note that a "numerology" may refer to a set of communication parameters that characterize the design of signals in a given RAT (Radio Access Technology), the design of a RAT and so on, or refer to parameters that are defined in the frequency direction and/or the time direction, such as subcarrier spacing (SCS), the duration of symbols, the duration of cyclic prefixes, the duration of subframes, and so forth.

Also, future radio communication systems are under research for introduction of time units (also referred to as "subframes," "slots," "minislots," "subslots," "transmission time intervals (TTIs)," "short TTIs (sTTIs)" "radio frames" and so on) that are the same as and/or different than existing LTE systems (LTE Rel. 13 or earlier versions), while supporting multiple numerologies and so on.

Note that a TTI may represent the time unit for use when transmitting/receiving transport blocks, code blocks and/or codewords for transmitting/receiving data. Assuming that a TTI is provided, the period of time (for example, the number of symbols) where the transport blocks, the code blocks and/or the codewords of data are actually mapped may be shorter than the TTI.

For example, when a given number of symbols (for example, 14 symbols) constitute a TTI, transmitting/receiving data's transport block, code block and/or codeword can be transmitted and received in a period of one or a given number of symbols in the constituent symbols. If the number of symbols in which a transport block, a code block and/or a codeword for transmitting/receiving data is transmitted and/or received is smaller than the number of symbols constituting a TTI, reference signals, control signals and so forth can be mapped to symbols in the TTI where no data is mapped.

Subframes may serve as a time unit having a given time duration (for example, 1 ms), irrespective of which numerology is used by (and/or configured in) the user terminal (for example, UE (User Equipment)).

On the other hand, slots may serve as a time unit that is based on the numerology used by the UE. For example, if the subcarrier spacing is 15 kHz or 30 kHz, the number of symbols per slot may be 7 or 14. When the subcarrier spacing is 60 kHz or greater, the number of symbols per slot may be 14. In addition, a slot may include a plurality of minislots (sub slots).

Envisaging such future radio communication systems, a study is in progress to support a UL control channel (hereinafter also referred to as a "short PUCCH") that is designed to be shorter in duration (have a shorter duration) than PUCCH (Physical Uplink Control CHannel) formats for existing LTE systems (for example, LTE Rel. 8 to 13) and/or a UL control channel (hereinafter also referred to as a "long PUCCH") that is designed to be longer in duration (have a longer duration) than the above short duration.

A short PUCCH (also referred to as a "shortened PUCCH") is formed with a given number of symbols (for example, 1 symbol, 2 symbols, or 3 symbols) provided in a given SCS. In this short PUCCH, uplink control information (UCI) and a reference signal (RS) may be time-division-multiplexed (TDM) or frequency-division-multiplexed (FDM). The RS may be, for example, the demodulation reference signal (DMRS (DeModulation Reference Signal)), which is used to demodulate UCI.

The SCS in each symbol of the short PUCCH may be the same as or higher than the SCS in symbols for data channels (hereinafter also referred to as "data symbols"). The data channels may be, for example, a downlink data channel (PDSCH (Physical Downlink Shared CHannel)), an uplink data channel (PUSCH (Physical Uplink Shared CHannel)) and so on.

Hereinafter, whenever "PUCCH" is simply mentioned, this may be read as "short PUCCH" or "PUCCH in short duration."

The PUCCH may be time-division-multiplexed (TDM) and/or frequency-division-multiplexed (FDM) with a UL data channel (hereinafter also referred to as "PUSCH") in the slot. Also, the PUCCH may be time-division-multiplexed (TDM) and/or frequency-division-multiplexed (FDM) with a DL data channel (hereinafter also referred to as "PDSCH") and/or a DL control channel (hereinafter also referred to as "PDCCH (Physical Downlink Control CHannel)") within the slot.

To provide schemes for transmitting short PUCCHs, a DMRS-based PUCCH (DMRS-based transmission), which reports UCI by transmitting UL signals, in which DMRSs and UCI are time-division-multiplexed (TDM), and a sequence-based PUCCH (or sequence-based transmission), which reports UCI by transmitting UL signals using code resources that are associated with UCI values, without using DMRSs, are under study.

A DMRS-based PUCCH transmits a PUCCH that contains the RS for demodulating UCI, and therefore may be referred to as "coherent transmission," "coherent design," and so on. A sequence-based PUCCH reports UCI in a PUCCH that does not contain the RS for demodulating UCI, and therefore may be referred to as "non-coherent transmission," "non-coherent design" and so on.

A sequence-based PUCCH transmits UL signals that use code resources associated with UCI values. A code resource refers to a resource that can be code-division-multiplexed (CDM), and may be at least one of a base sequence, the amount of cyclic shift (amount of phase rotation) and an OCC (Orthogonal Cover Code). A cyclic shift may be read as a phase rotation.

Although cases will be described below in which the cyclic shift amounts (the phase rotation amounts) are associated with UCI values and/or positive/negative SRs, it is equally possible to use other code resources, instead of the cyclic shift amounts, by selecting different base sequences, different orthogonal codes and so on.

Information related to code resources may be configured (reported) from the NW (network, including, for example, a radio base station, gNodeB, and so forth), to UE, through higher layer signaling (for example, RRC (Radio Resource Control) signaling, MAC (Medium Access Control) signaling, broadcast information (the MIB (Master Information Block), SIBs (System Information Blocks), etc.) or physical layer signaling (for example, DCI)), or by combining these.

Base sequences may be CAZAC (Constant Amplitude Zero Auto-Correlation) sequences (for example, Zadoff-Chu sequences), or may be sequences that are equivalent to CAZAC sequences (for example, CG-CAZAC (Computer-Generated CAZAC) sequences), such as ones specified in 3GPP TS 36.211 § 5.5.1.2 (in particular, table 5.5.1.2-1 and table 5.5.1.2-2).

Now, a case will be described below, in which a sequence-based PUCCH transmits 2-bit UCI by using cyclic shifts. A number of candidates of cyclic shift amount (phase rotation amounts) that are allocated to 1 UE are referred to as a "cyclic shift candidate set (cyclic shift amount pattern, phase rotation amount pattern, etc.)."

Figure 1B:
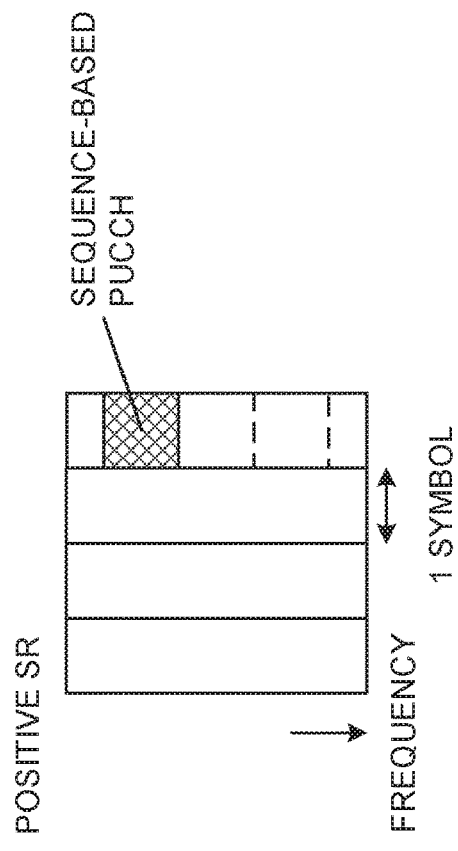

The sequence length of a base sequence is determined by the number of subcarriers M and the number of PRBs (Physical Resource Blocks). When a sequence-based PUCCH is transmitted using a unit band of 1 PRB, the sequence length of the base sequence is 12 (=12×1). In this case, as shown in FIGS. 1A and 1B, 12 phase rotation amounts $\alpha_0$ to $\alpha_{11}$, which are provided at phase intervals of $2\pi/12$ (that is, $\pi/6$) are defined. By applying phase rotation (cyclic shift) to 1 base sequence based on phase rotation amounts $\alpha_0$ to $\alpha_{11}$, individually, 12 sequences that are orthogonal to each other (with zero cross-correlation) are derived. Note that phase rotation amounts $\alpha_0$ to $\alpha_{11}$ may be defined based on at least one of the number of subcarriers, M, the number of PRBs and the sequence length of the base sequence. A cyclic shift candidate set may be comprised of two or more phase rotation amounts that are selected out of phase rotation amounts $\alpha_0$ to $\alpha_{11}$.

UCI contains, for example, at least one of an ACK/NACK, CSI and an SR. A positive SR and UCI apart from positive/negative SRs may be referred to as "UCI containing an SR," and a negative SR and UCI apart from positive/negative SRs may be referred to as "UCI not containing an SR." In the following description, UCI apart from positive/negative SRs will be referred to as "UCI." UCI contains, for example, at least one of an ACK/NACK (A/N) and CSI.

Here, the sequence-based PUCCH reports UCI using 2 bits and the presence/absence of an SR using 1 bit. Hereinafter, the phrase "positive SR" refers to the case where an SR is present when transmitting a sequence-based PUCCH, and the phrase "negative SR" refers to the case where an SR is absent when transmitting a sequence-based PUCCH.

The following 2 SR reporting methods have are under study as methods for reporting positive/negative SRs (SR is present or absent) by using a sequence-based PUCCH.

As shown in FIG. 1, the first SR reporting method reports positive/negative SRs by using time/frequency resources (time resources and/or frequency resources, such as, for example, PRBs) that are used for a sequence-based PUCCH. 2 different time/frequency resources are allocated respectively for positive SR and negative SR. For example, in the same time resource, the frequency resource for positive SR shown in FIG. 1A and the frequency resource for negative SR shown in FIG. 1B may be allocated to UE. If 2 time/frequency resources correspond to positive SR and negative SR, respectively, frequency resources may be the same and time resources may be different, or time resources and frequency resources may be different.

As shown in FIG. 1B, when UCI is comprised of 2 bits, among 4 candidate values of the 2-bit UCI, the UE rotates the phase of a base sequence based on the amount of phase rotation that corresponds to the value to be transmitted, and transmits the signal with the rotated phase by using given time/frequency resources. The time/frequency resource may be a time resource (for example, a subframe, a slot, a symbol, etc.) and/or a frequency resource (for example, a carrier frequency, a channel band, a CC (Component Carrier), a PRB, etc.).

For example, when UCI is comprised of 2 bits, the UCI values 00, 01, 11 and 10 may correspond to a "NACK-NACK," a "NACK-ACK," an "ACK-ACK" and an "ACK-NACK," respectively.

The UE transmits a sequence-based PUCCH, representing UCI, by using the time/frequency resources corresponding to positive SR and negative SR, respectively. The NW detects positive/negative SR from the received sequence-based PUCCH's time/frequency resources.

As shown in FIG. 2, the second SR reporting method reports positive/negative SR by using cyclic shift candidate sets that are used for a sequence-based PUCCH. For example, a cyclic shift candidate set for negative SR and a cyclic shift candidate set for positive SR may be allocated to the UE. The cyclic shift candidate set here includes cyclic shift amounts (phase rotation amounts) that respectively correspond to a plurality of candidate values of UCI.

The UE transmits a sequence-based PUCCH, which represents UCI, by using one of the cyclic shift candidate set for positive SR and the cyclic shift candidate set for positive SR. The NW detects positive/negative SR from the received sequence-based PUCCH's cyclic shift candidate set.

Figure 2B:
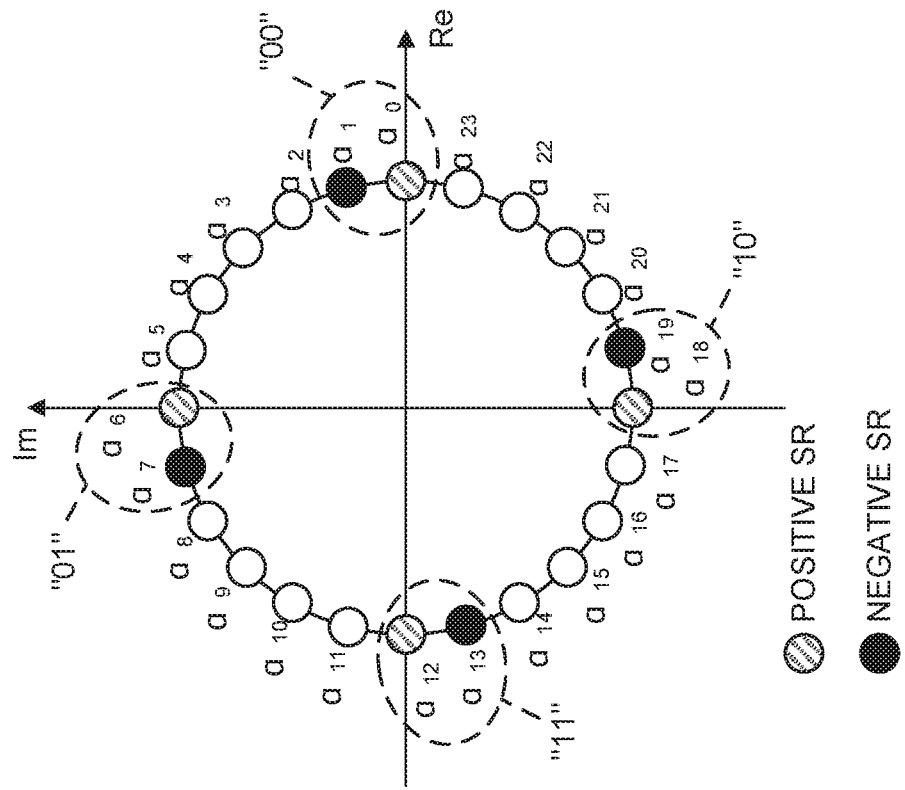
FIGS. 2A and 2B are diagrams to show examples of second SR reporting methods.
Figure 2A:
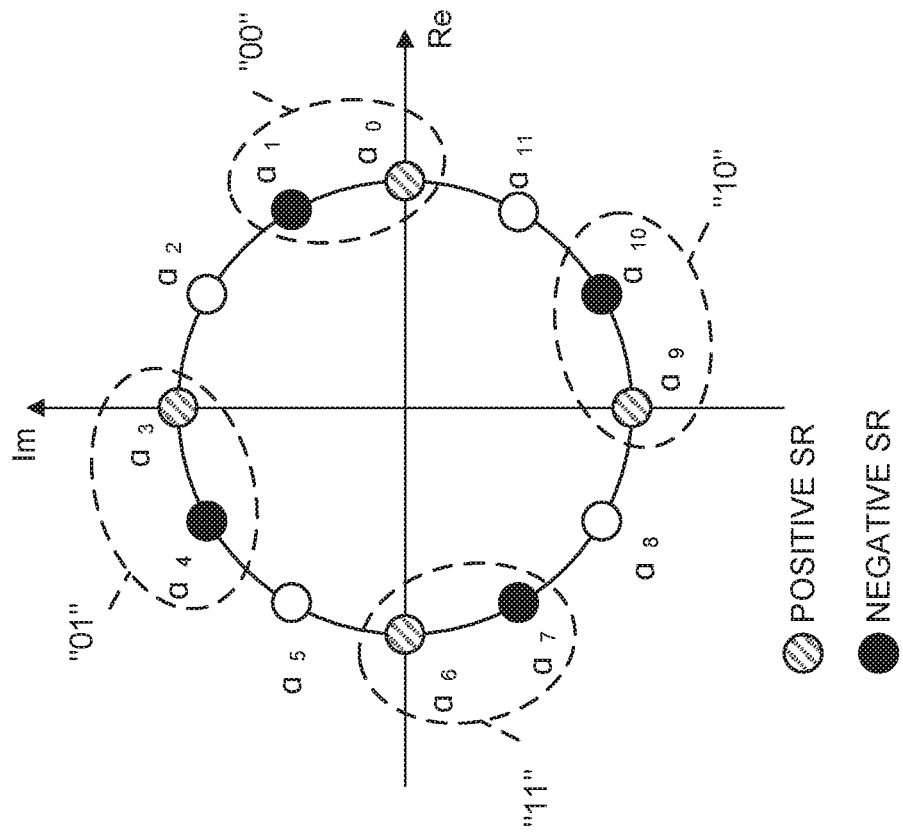

If the bandwidth of the sequence-based PUCCH is 1 PRB or more, the sequence-based PUCCH can use a sequence of sequence length 12 by using at least 12 subcarriers, so that 12 cyclic shift amounts (phase rotation amounts) can be used. In this case, for example, as shown in FIG. 2A, for the UE, the 2-bit UCI values 00, 01, 11 and 10 for positive SR are assigned phase rotation amount candidates $\alpha_0$, $\alpha_3$, $\alpha_6$ and $\alpha_9$, respectively, and the 2-bit UCI values 00, 01, 11, and 10 for negative SR are assigned phase rotation amount candidates $\alpha_1$, $\alpha_4$, $\alpha_7$ and $\alpha_{10}$, respectively. The UE transmits the sequence-based PUCCH based on the amount of phase rotation that matches the combination of the UCI value and positive/negative SR, amongst the 8 phase rotation amount candidates that are assigned.

When a sequence-based PUCCH has a bandwidth of 2 PRBs or more, the sequence-based PUCCH can use a sequence of sequence length 24 by using at least 24 subcarriers, so that 24 cyclic shift amounts (phase rotation amounts) can be used. In this case, for example, as shown in FIG. 2B, for the UE, the 2-bit UCI values 00, 01, 11 and 10 for positive SR are assigned phase rotation amount candidates $\alpha_0$, $\alpha_6$, $\alpha_{12}$ and $\alpha_{18}$, respectively, and the 2-bit UCI values 00, 01, 11, and 10 for negative SR are assigned phase rotation amount candidates $\alpha_1$, $\alpha_7$, $\alpha_{13}$, and $\alpha_{19}$, respectively. The UE transmits the sequence-based PUCCH based on the amount of phase rotation that matches the combination of the UCI value and positive/negative SR, amongst the 8 phase rotation amount candidates that are assigned.

The requirement for the error rate of UCI may be more stringent than the requirement for the error rate of the positive/negative SR. According to the assignments of phase rotation amount candidates illustrated in FIG. 2, compared to the gap between 2 phase rotation amount candidates, corresponding to positive SR and negative SR, respectively, the gap between 2 phase rotation amount candidates corresponding to 2 different UCI values is large, so that, in an environment that is severely frequency-selective, it is possible to lower the error rate of UCI compared to the error rate of SRs.

Note that, even if the sequence-based PUCCH has a bandwidth of 2 PRBs or more, the phase rotation amounts for use may be limited to 12. In this way, the gap between 2 phase rotation amount candidates corresponding to positive SR and negative SR becomes wider, and the error rate performance in the event of positive SR and negative SR can be improved even in an environment where the frequency selectivity is severe.

FIG. 3 provide diagrams to show examples of transmission signal generation processes for sequence-based PUCCHs. In these transmission signal generation processes, phase rotation (cyclic shift) is applied to base sequences $X_0$ to $X_{M-1}$ of sequence length M, based on selected phase rotation amounts $\alpha$, and the phase-rotated base sequences are input to an OFDM (Orthogonal Frequency Division Multiplexing) transmitter or a DFT-S-OFDM (Discrete Fourier Transform-Spread-Orthogonal Frequency Division Multiplexing) transmitter. The UE transmits output signals from the OFDM transmitter or the DFT-S-OFDM transmitter.

Figure 3A:
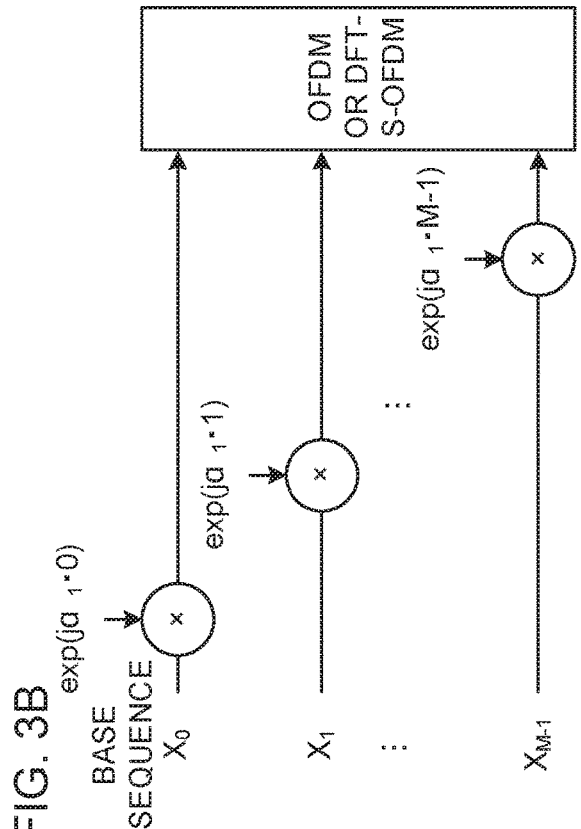
FIGS. 3A to 3D are diagrams to show examples of transmission signal generation processes for sequence-based PUCCH.
Figure 3B:
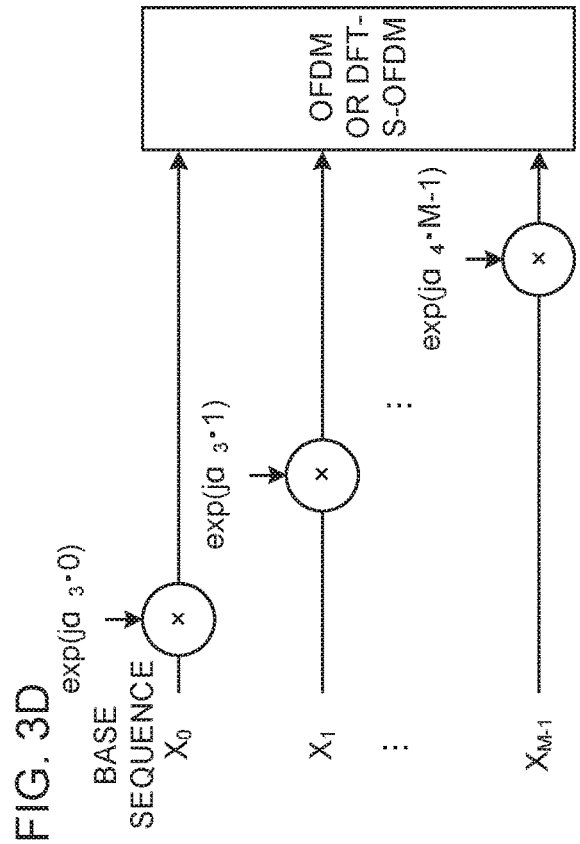
Figure 3C:
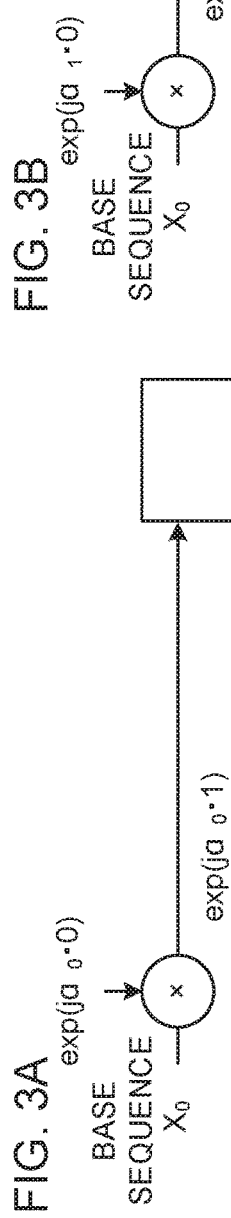
Figure 3D:
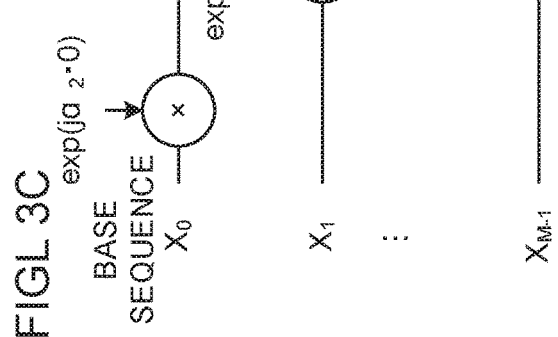

When phase rotation amount candidates $\alpha_0$ to $\alpha_3$ are associated with UCI information candidates 0 to 3, respectively, and information 0 is reported as UCI, as shown in FIG. 3A, the UE rotates the phases of base sequences $X_0$ to $X_{M-1}$ based on $\alpha_0$, which is the amount of phase rotation associated with information 0. Similarly, when the UE reports information 1 to 3 as UCI, as shown in FIGS. 3B, 3C and 3D, the UE rotates the phases of base sequences $X_0$ to $X_{M-1}$ based on $\alpha_1$, $\alpha_2$ and $\alpha_3$, which are the phase rotation amounts associated with information 1 to 3, respectively.

Next, decoding of UCI that is reported in a sequence-based PUCCH will be described below. Here, although the receipt detection operation to be carried out when UCI is reported by selecting the amount of phase rotation will be described below, the same operation will apply even when UCI is reported by selecting different types of resources (for example, base sequences, time/frequency resources, etc.) or combinations of multiple types of resources.

The NW may detect UCI from a received signal by using maximum likelihood detection (which may be referred to as "MLD" or "correlation detection"). To be more specific, the network may generate a replica of every amount of phase rotation (phase rotation amount replicas) that is assigned to the user terminal (for example, the network may generate 4 patterns of phase rotation amount replicas if the length of the UCI payload is 2 bits), and generate transmission signal waveforms, as the user terminal does, based on the base sequences and the phase rotation amount replicas. Also, the network may calculate the correlation between the transmission signal waveforms derived thus, and the waveform of the signal as received from the user terminal, for all the phase rotation amount replicas, and assume that the phase rotation amount replica to show the highest correlation has been transmitted.

To be more specific, the network may multiply each element of received signal sequences of size M after the DFT (M complex-number sequences) by complex conjugates of transmission signal sequences (M complex-number sequences), which are given by applying phase rotations to the base sequence of the transmission signal based on phase rotation amount replicas, and assume that the phase rotation amount replica, where the resultant absolute value (or the square of the absolute values) of the sum of the M sequences is the largest, has been sent.

Alternatively, the network may generate transmission signal replicas to match the maximum number of phase rotation amounts that can be assigned (24 amounts for 2 PRBs), and estimate the amount of phase rotation to yield the highest correlation with the received signal, based on the same operation as the MLD-based operation described above. If the estimated amount of phase rotation is different from the ones assigned, the network may assume that the amount of phase rotation that is closest to the estimated amount of phase rotation, among the assigned phase rotation amounts, has been transmitted.

The base station, for example, judges the UCI value and the positive/negative SR by performing MLD on the received sequence-based PUCCH.

In this way, a sequence-based PUCCH that multiplexes UCI and the positive/negative SR can report the positive/negative SR while keeping the error rate of UCI low.

When supporting sequence-based PUCCHs of multiple schemes, how to select the format of sequence-based PUCCHs arises as a problem. So, the present inventors have worked on a method of selecting sequence-based PUCCH formats, and arrived at the present invention.

Now, embodiments of the present invention will be described below in detail with reference to the accompanying drawings. Note that the radio communication methods according to each embodiment may be applied individually or may be applied in combination.

(Radio Communication Method)

First Embodiment

In the first embodiment of the present invention, UE selects the reporting scheme based on what time/frequency resources are used for a sequence-based PUCCH. The time/frequency resources can be configured from the NW.

Figure 4A:
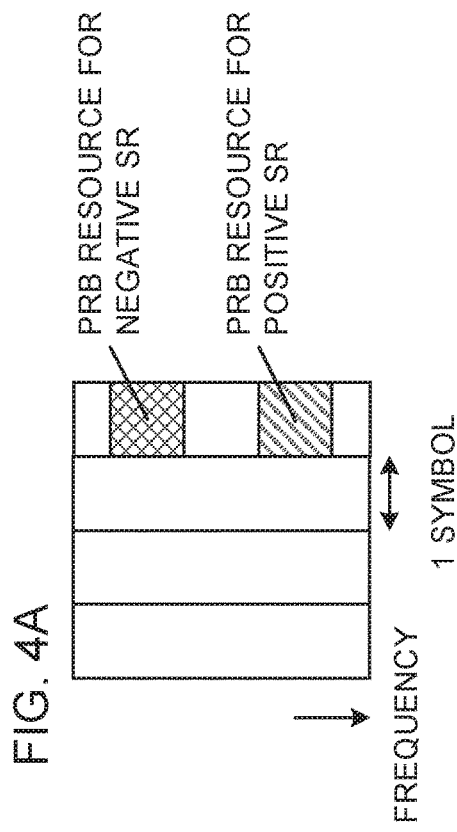
FIGS. 4A to 4C are diagrams to show examples of resources for use in the first SR reporting method.
Figure 5A:
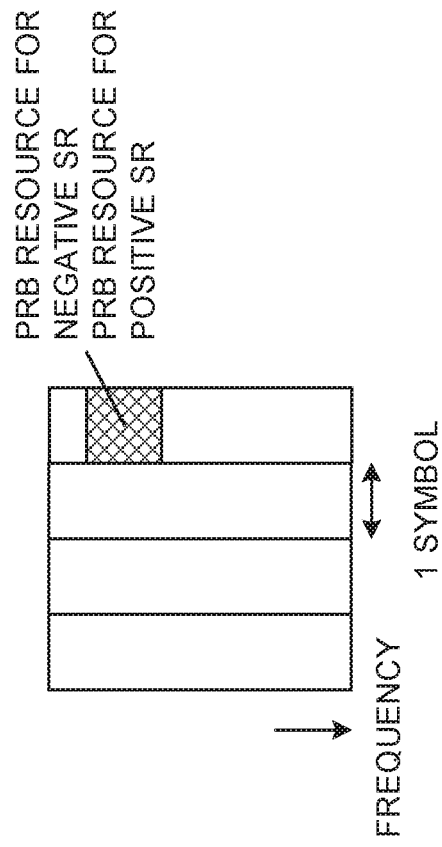
FIGS. 5A and 5B are diagrams to show examples of resources for use in the second SR reporting method.

When, as shown in FIG. 4A, 2 different time/frequency resources are configured for positive SR and negative SR, the UE reports positive/negative SRs by using the first SR reporting method. When, as shown in FIG. 5A, the same time/frequency resources are configured for positive SR and negative SR, the UE reports positive/negative SRs by using the second SR reporting method. That is, the UE switches between the first SR reporting method and the second SR reporting method depending on what resources are configured for sequence-based PUCCHs.

Figure 4C:
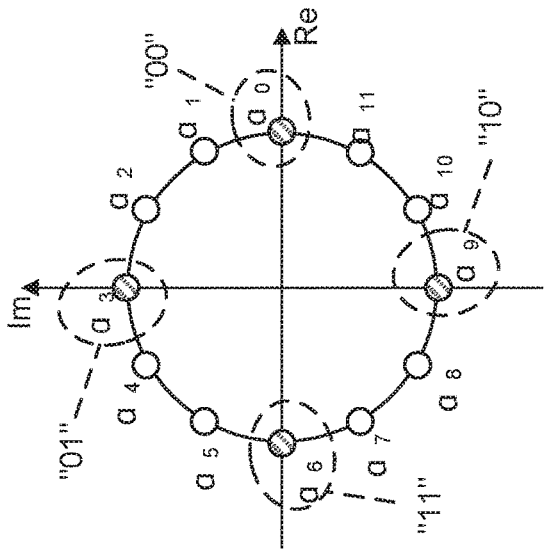
Figure 4B:
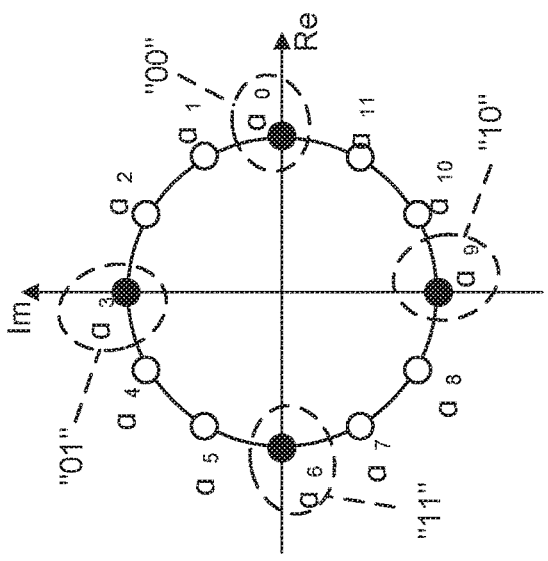

When 2 time/frequency resources in FIG. 4A are configured for positive SR and negative SR, for example, as shown in FIG. 4B, the cyclic shift candidate set for use in negative SR reporting is comprised of $\alpha_0$, $\alpha_3$, $\alpha_6$ and $\alpha_9$, corresponding to UCI values 00, 01, 11 and 10, respectively. The cyclic shift candidate set for use in positive SR reporting is, for example, the same as the cyclic shift candidate set for negative SR, as shown in FIG. 4C. If such resource configuration is applied to a sequence-based PUCCH, the UE transmits the sequence-based PUCCH by using time/frequency resources corresponding to positive SR and negative SR, respectively, according to the first SR reporting method. The cyclic shift candidate set for positive SR may be different from the cyclic shift candidate set for negative SR.

Figure 5B:
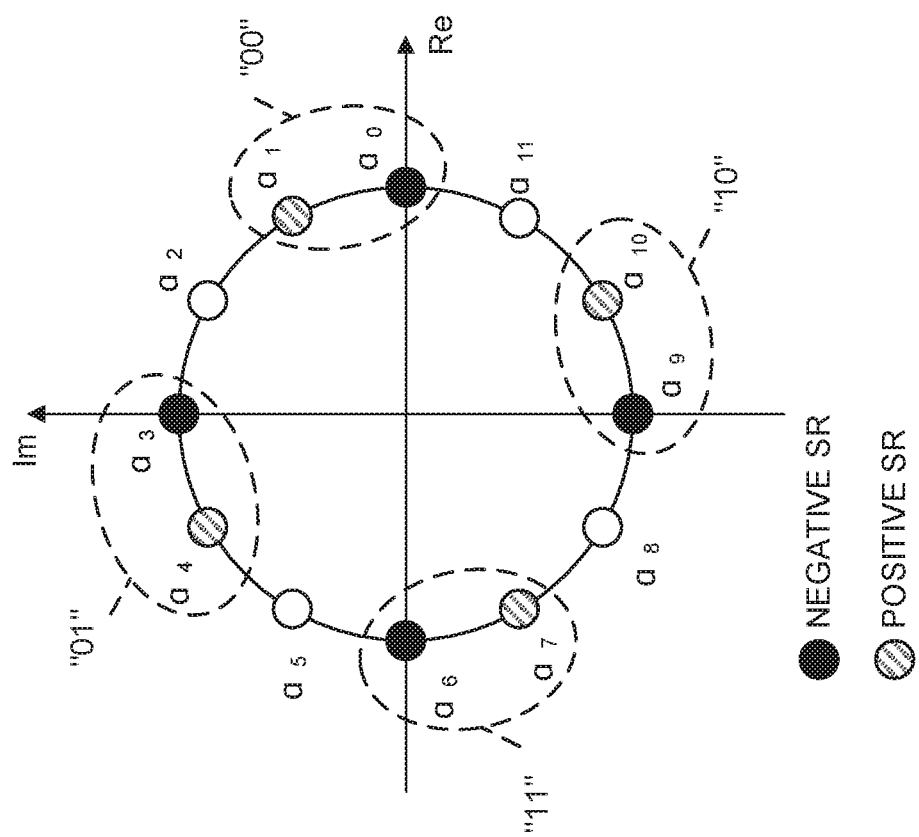

When 1 time/frequency resources in FIG. 5A is configured for positive SR and negative SR, for example, as shown in FIG. 5B, the cyclic shift candidate set for use in negative SR reporting is comprised of $\alpha_0$, $\alpha_3$, $\alpha_6$ and $\alpha_9$, corresponding to UCI values 00, 01, 11 and 10, respectively, and the cyclic shift candidate set for use in positive SR reporting is comprised of $\alpha_1$, $\alpha_4$, $\alpha_7$ and $\alpha_{10}$, corresponding to UCI values 00, 01, 11 and 10, respectively. That is, cyclic shift candidate sets that correspond to positive SR and negative SR must be different. If such resource configuration is applied to a sequence-based PUCCH, the UE transmits the sequence-based PUCCH by using the cyclic shift candidate set corresponding to positive SR or negative SR, according to the second SR reporting method.

This operation allows the UE to choose the method for reporting SRs, without having the SR reporting method reported to the UE, so that the amount of information to be reported from the NW to the UE can be reduced. According to the first reporting method, positive/negative SRs can be reported using different time/frequency resources, so that the amount of code resources to use can be reduced. According to the second reporting method, positive/negative SRs can be reported using different code resources, so that the amount of code resources to use can be reduced.

Second Embodiment

A second embodiment of the present invention makes use of the first SR reporting method. That is, varying time/frequency resources correspond to positive SR and negative SR. The case where the same time resource and different frequency resources are allocated for positive SR and negative SR will be described. Note that different time resources may be allocated for positive SR and negative SR.

«Reporting of 2 Frequency Resources Corresponding to Positive SR and Negative SR»

Resources for sequence-based PUCCHs corresponding to positive SR and negative SR, respectively, may be reported from the NW to UE.

It may be assumed that time resources, frequency resources, cyclic shift candidate sets are reported as resources for the sequence-based PUCCHs. Resources for the sequence-based PUCCHs may be reported by way of higher layer signaling and/or physical layer control information. Also, multiple candidate resources for the sequence-based PUCCHs may be reported by way of higher layer signaling and/or cell information, or resources for the sequence-based PUCCHs may be selected, from among multiple candidate resources, by way of higher layer signaling and/or physical layer control information.

The UE transmits a sequence-based PUCCH, representing UCI, by using the time/frequency resources corresponding to positive SR and negative SR, respectively.

Figure 6A:
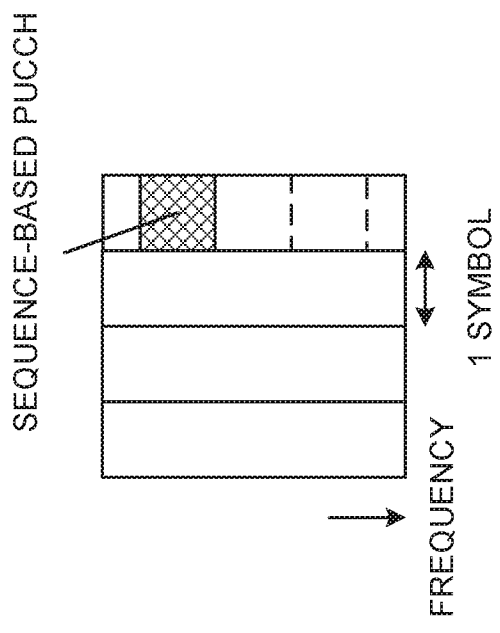
FIGS. 6A and 6B are diagrams to show examples of resources for negative SR reporting.
Figure 6B:
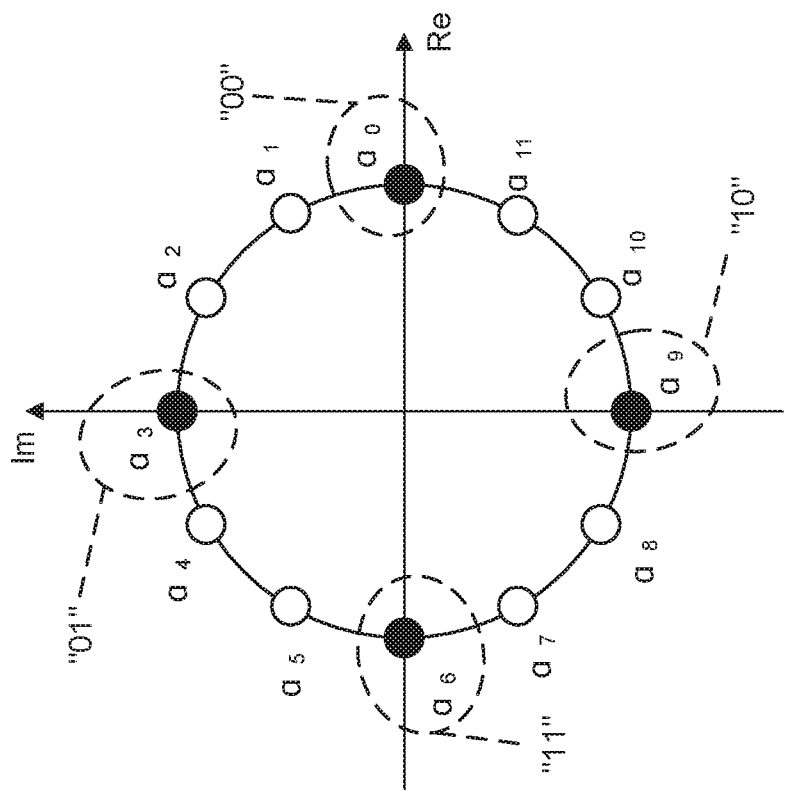

For example, as shown in FIG. 6A, time/frequency resources for negative SR are configured, and, as shown in FIG. 6B, a cyclic shift candidate set for negative SR is configured. For example, as shown in FIG. 7A, time/frequency resources for positive SR are configured, and, as shown in FIG. 7B, a cyclic shift candidate set for positive SR is configured.

In the examples of FIG. 6B and FIG. 7B, different cyclic shift sets are configured for positive SR and negative SR. Thus, if not only different time/frequency resources are configured for positive SR and negative SR, but also different cyclic shift candidate sets are configured for positive SR and negative SR, the NW may detect positive/negative SR and the value of UCI from the combination of time/frequency resources and cyclic shift candidate sets.

When resources for negative SR reporting are reported, the UE may select resources for positive SR reporting based on a given selection method. In addition, when resources for positive SR reporting are reported, resources for negative SR reporting may be selected based on a given method.

According to this operation, the NW can flexibly configure resources for positive SR reporting and resources for negative SR reporting.

«Determining Frequency Resource for One of Positive SR and Negative SR from Frequency Resource for the Other»

The UE may select the frequency resource for positive SR reporting, based on a given allocation pattern, in the same time resource (the same symbol) as the resource for negative SR reporting. The sequence-based PUCCHs for negative SR and positive SR may use the same transmission bandwidth (the same number of PRBs).

Now, the method of selecting frequency resources for one of positive SR and negative SR from frequency resources for the other one (frequency resource allocation patterns) will be described below.

Figure 8A:
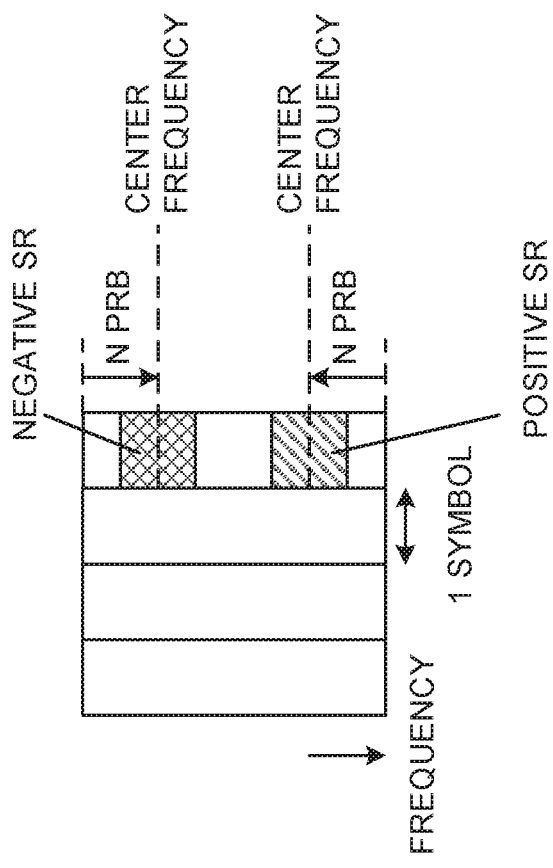
FIGS. 8A and 8B are diagrams to show examples of frequency resource allocation patterns.

For example, given frequency resource allocation pattern #1, as shown in FIG. 8A, the frequency (PRB) index of a frequency resource for negative SR is increased by a given number (N PRBs), in the positive direction of frequency indices, and the UE may select the frequency resource corresponding to the resulting frequency index, as a frequency resource for positive SR.

Figure 8B:
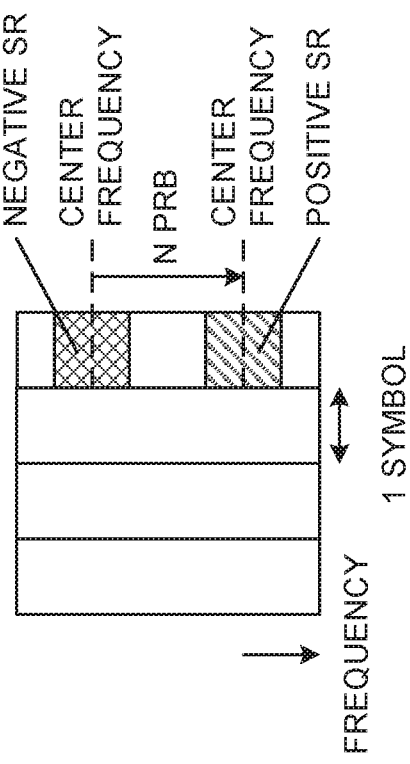

For example, given frequency resource allocation pattern #2, as shown FIG. 8B, the UE may select the frequency resource located at a symmetrical position from the end of the system band or the UE's transmission band, with respect to a frequency resource for negative SR, as a frequency resource for positive SR. The frequency resource for positive SR may be symmetrical to the frequency resource for negative SR with respect to the center frequency of the system band or the transmission band. The frequency resource for positive SR may be symmetrical to the frequency resource for negative SR with respect to the lowest frequency (for example, the lowest frequency index) of the system band or the transmission band. The frequency resource for positive SR may be symmetrical to the frequency resource for negative SR with respect to the highest frequency of the system band or the transmission band.

The frequency resource allocation pattern and/or the given number N may be reported to all UEs, in common, by using cell information such as broadcast information, may be reported on a per UE basis, by way of higher layer signaling and/or physical layer control information, or may be configured in advance by the specification.

The method of selecting a cyclic shift candidate set for one of positive SR and negative SR from a cyclic shift candidate set for the other one (cyclic shift candidate set allocation pattern) will be described below.

Figure 9B:
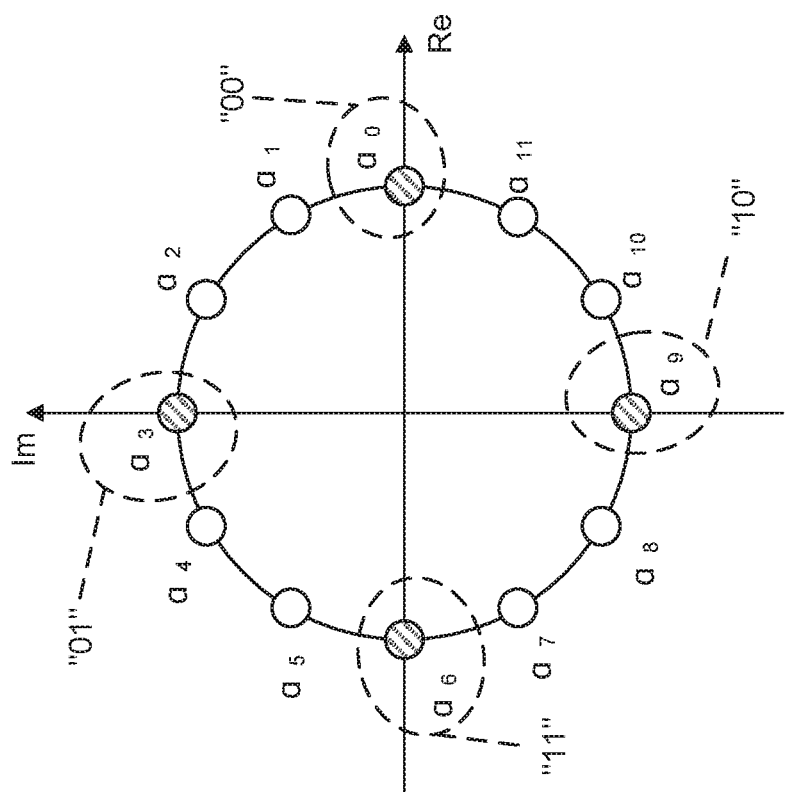
FIGS. 9A and 9B are diagrams to show cyclic shift candidate set allocation pattern #1.
Figure 9A:
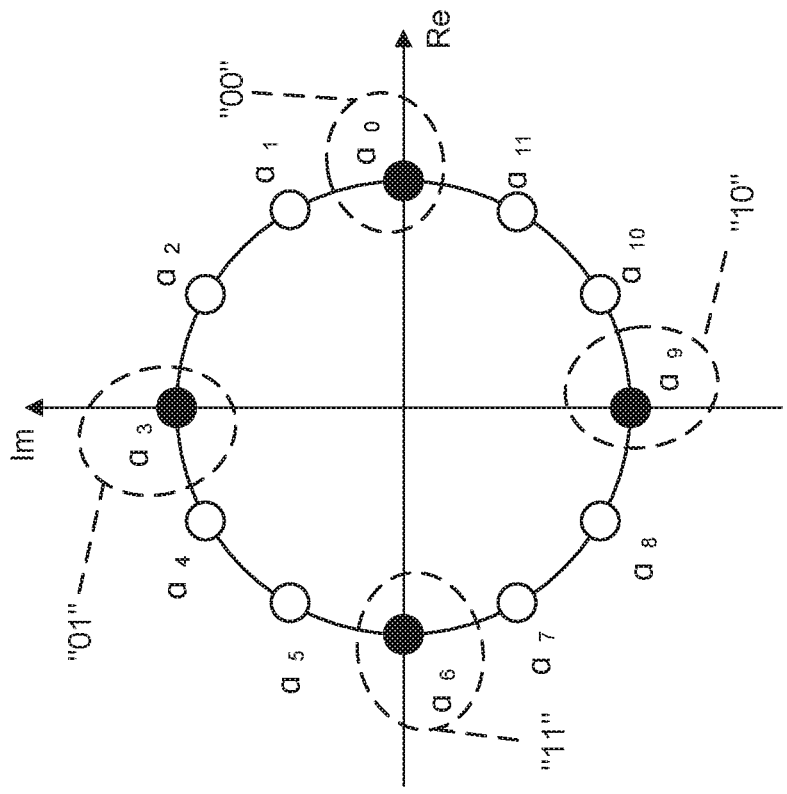

For example, given cyclic shift candidate set allocation pattern #1, the UE selects the same cyclic shift candidate set as the cyclic shift candidate set for negative SR as the cyclic shift candidate set for positive SR. As shown in FIG. 9A, if $\alpha_0$, $\alpha_3$, $\alpha_6$ and $\alpha_9$ are configured as a cyclic shift candidate set for negative SR, the UE configures $\alpha_0$, $\alpha_3$, $\alpha_6$ and $\alpha_9$ as a cyclic shift candidate set for positive SR, as shown in FIG. 9B.

For example, given cyclic shift candidate set allocation pattern #2, the UE rotates the cyclic shift candidate set for negative SR by one to the left, and uses the resulting cyclic shift candidate set for the cyclic shift candidate set for positive SR. As shown in FIG. 10A, if $\alpha_0$, $\alpha_3$, $\alpha_6$ and $\alpha_9$ are configured as a cyclic shift candidate set for negative SR, the UE configures $\alpha_1$, $\alpha_4$, $\alpha_7$ and $\alpha_{10}$ as a cyclic shift candidate set for positive SR, as shown in FIG. 10B.

Figure 11B:
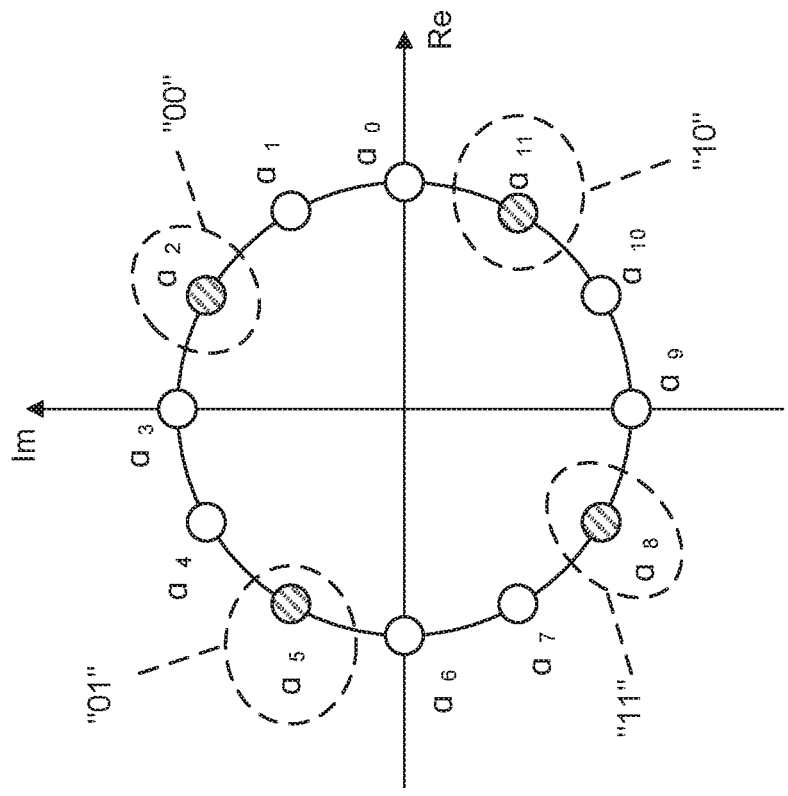
FIGS. 11A and 11B are diagrams to show cyclic shift candidate set allocation pattern #3.
Figure 11A:
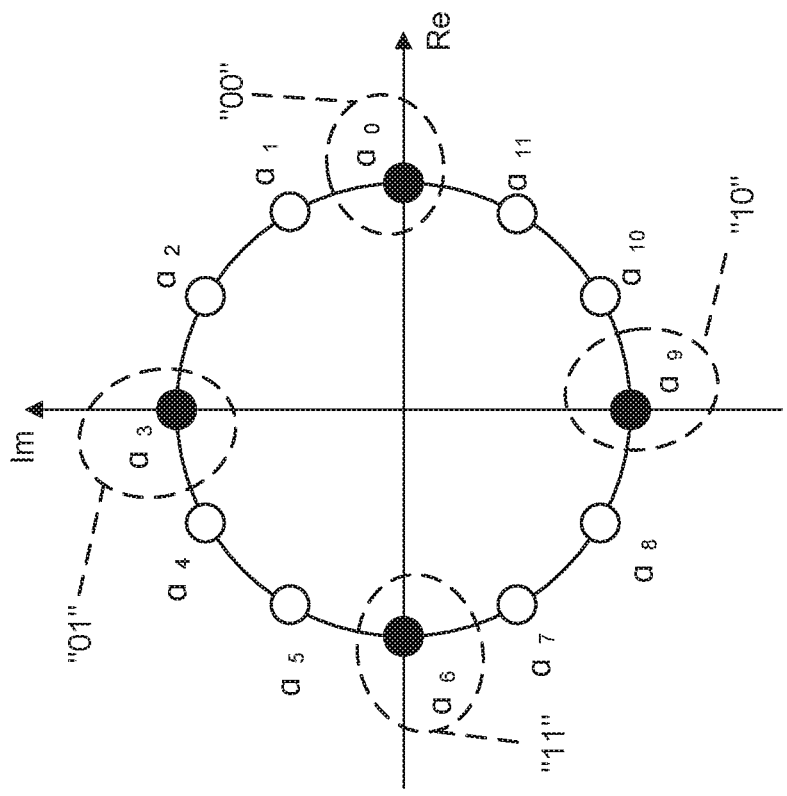

For example, given cyclic shift candidate set allocation pattern #3, the UE rotates the cyclic shift candidate set for negative SR by two to the left, and uses the resulting cyclic shift candidate set for the cyclic shift candidate set for positive SR. As shown in FIG. 11A, if $\alpha_0$, $\alpha_3$, $\alpha_6$ and $\alpha_9$ are configured as a cyclic shift candidate set for negative SR, the UE configures $\alpha_2$, $\alpha_5$, $\alpha_8$ and $\alpha_{11}$ as a cyclic shift candidate set for positive SR, as shown in FIG. 9B.

The cyclic shift candidate set allocation pattern may be reported to all UEs, in common, by using cell information such as broadcast information, may be reported on a per UE basis, by way of higher layer signaling and/or physical layer control information, or may be configured in advance by the specification.

According to this operation, the NW has only to report one of the resources for positive SR reporting and negative SR reporting, so that the amount of information to report resources can be reduced.

Third Embodiment

A third embodiment of the present invention makes use of the second SR reporting method. That is, varying cyclic shift candidate sets correspond to positive SR and negative SR.

When resources for negative SR reporting are reported, the UE may select resources for positive SR reporting based on a given selection method. In addition, when resources for positive SR reporting are reported, resources for negative SR reporting may be selected based on a given method.

For example, when, as shown in FIG. 12A, the same time/frequency resources are configured for positive SR and negative SR, 3 cyclic shift candidate sets #1, #2 and #3 can be used, as shown in FIG. 12B. The cyclic shift candidate sets here each include cyclic shift amounts (phase rotation amounts) that respectively correspond to a plurality of candidate values of UCI. Cyclic shift candidate set #1 includes $\alpha_0$, $\alpha_3$, $\alpha_6$ and $\alpha_9$. Cyclic shift candidate set #2 includes $\alpha_1$, $\alpha_4$, $\alpha_7$ and $\alpha_{10}$. Cyclic shift candidate set #3 includes $\alpha_2$, $\alpha_5$, $\alpha_9$ and all.

If cyclic shift candidate set #1 is reported for negative SR and the same time/frequency resources are configured for positive SR and negative SR, the UE may use cyclic shift candidate set #2 for positive SR. In this case, the UE may use cyclic shift candidate set #3 for positive SR.

Also, if a cyclic shift candidate set is reported for negative SR and the same time/frequency resources are configured for positive SR and negative SR, the UE may select "the cyclic shift candidate set number for negative SR+1" as the cyclic shift candidate set number for positive SR. That is, the UE may determine that the cyclic shift candidate set number for positive SR is 2 when the cyclic shift candidate set number for negative SR is 1, the UE may determine that the cyclic shift candidate set number for positive SR is 3 when the cyclic shift candidate set number for negative SR is 2, and the UE may determine that the cyclic shift candidate set number for positive SR is 1 when the cyclic shift candidate set number for negative SR is 3.

Also, if a cyclic shift candidate set is reported for negative SR and the same time/frequency resources are configured for positive SR and negative SR, the UE may select "the cyclic shift candidate set number for negative SR+given value P (where 1 is 1 or 2)" as the cyclic shift candidate set number for positive SR.

The frequency resource allocation pattern and/or the given number N may be reported to all UEs, in common, by using cell information such as broadcast information, may be reported on a per UE basis, by way of higher layer signaling and/or physical layer control information, or may be configured in advance by the specification.

Figure 13A:
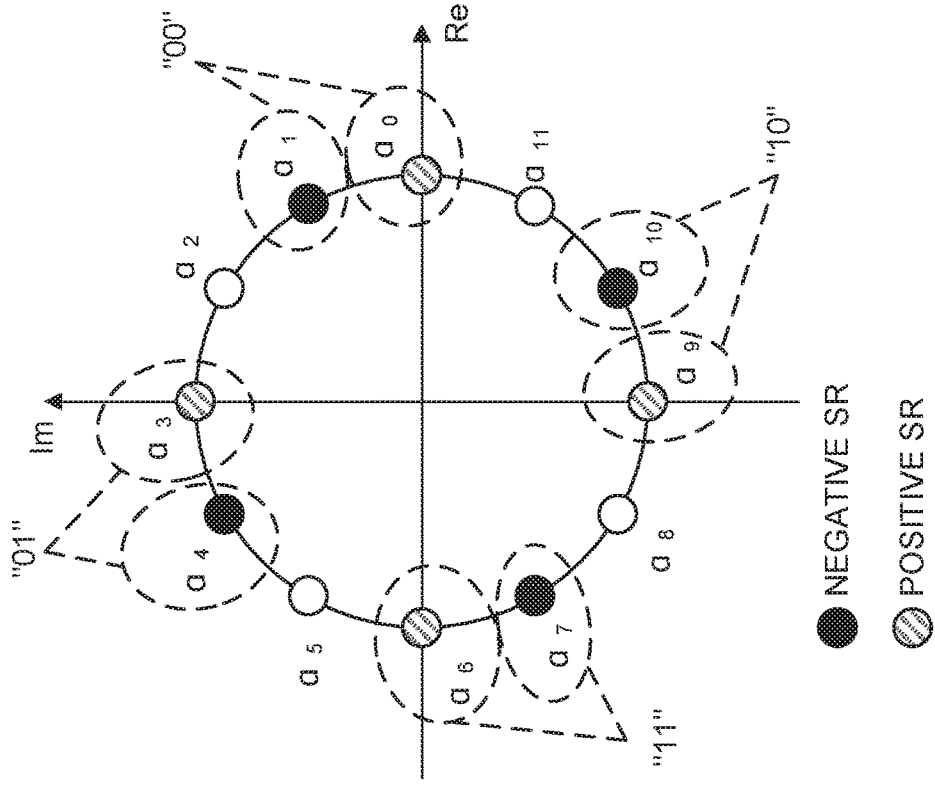
FIGS. 13A and 13B are diagrams to show examples of methods of determining a cyclic shift candidate set for one of positive SR and negative SR based on a cyclic shift candidate set for the other one.

If, as shown in FIG. 13A, P is 1, cyclic shift candidate set #1 is reported for negative SR, and the same time/frequency resources are configured for positive SR and negative SR, the UE may select cyclic shift candidate set #2 for positive SR.

Figure 13B:
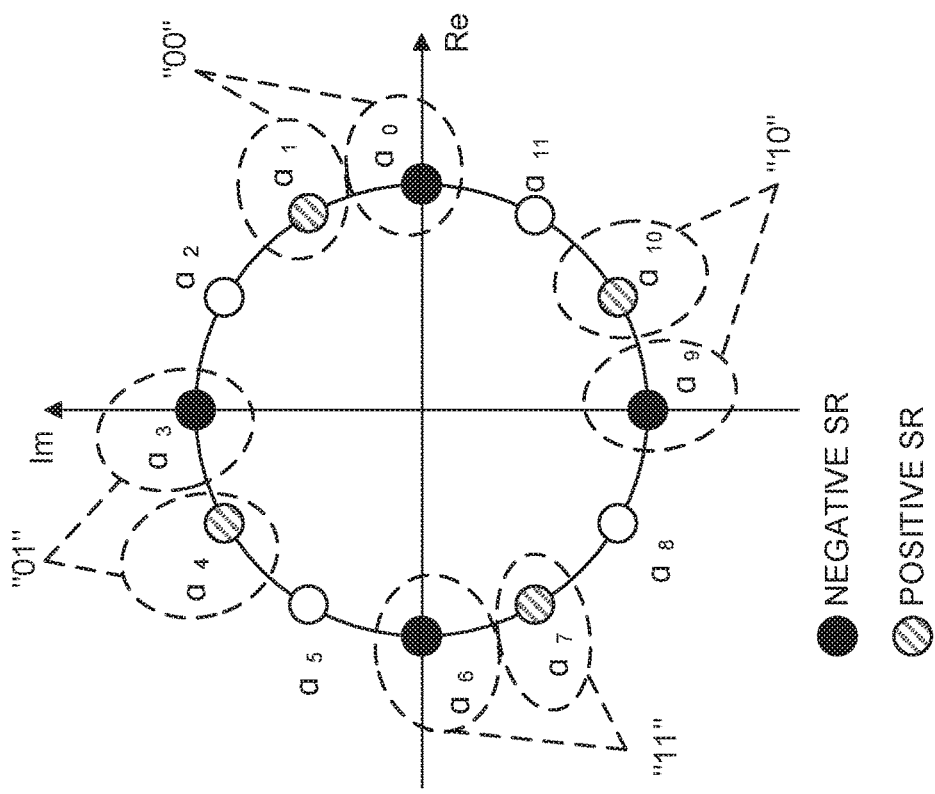

For example, the cyclic shift candidate set number for negative SR may be selected based on the cyclic shift candidate set number for positive SR. If, as shown in FIG. 13B, P is 1, cyclic shift candidate set #1 is reported for positive SR, and the same time/frequency resources are configured for positive SR and negative SR, the UE may select cyclic shift candidate set #2 for negative SR.

According to this operation, the NW has only to report one of the resources for positive SR reporting and negative SR reporting, so that the amount of information to report resources can be reduced.

Fourth Embodiment

How to allocate cyclic shift candidate sets surfaces as a problem. With a fourth embodiment of the present invention, UE may assume that the phase rotation amounts (cyclic shift amounts) included in a cyclic shift candidate set are provided at regular intervals. Here, the second SR reporting method will be used.

Figure 14A:
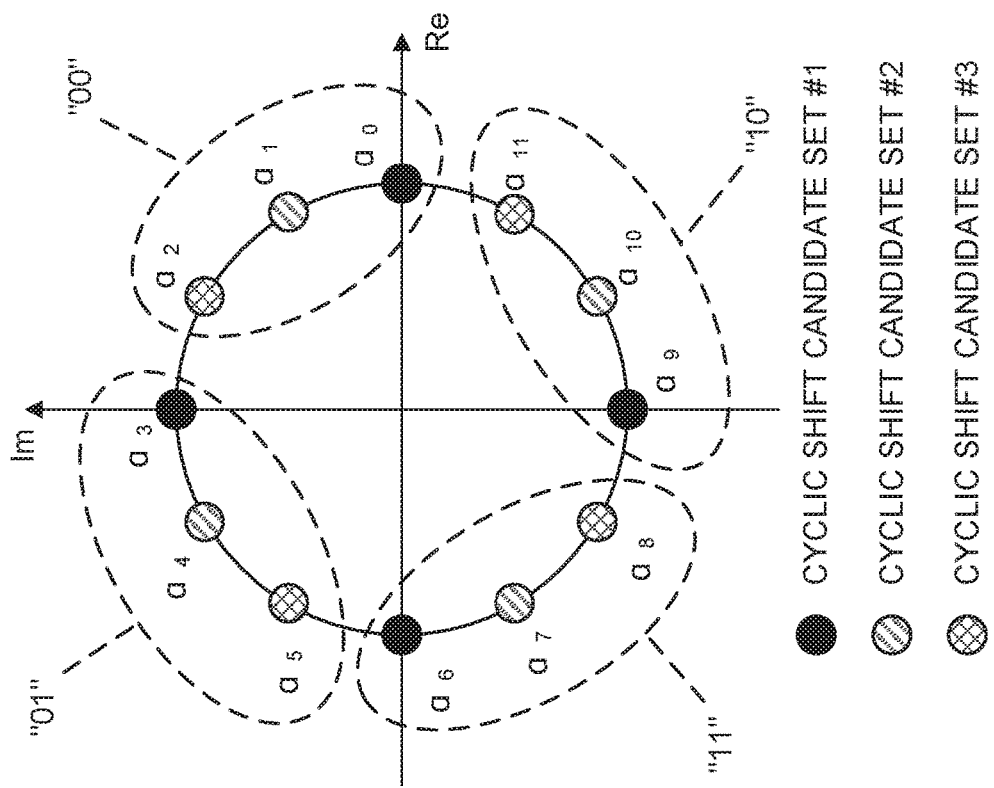
FIGS. 14A and 14B are diagrams to show examples of cyclic shift candidate sets provided at regular intervals.

When UCI is comprised of 1 bit, as shown in FIG. 14A, a cyclic shift candidate set may contain 2 phase rotation amounts at regular intervals of $\pi$. In this case, 6 cyclic shift candidate sets are available for use.

Figure 14B:
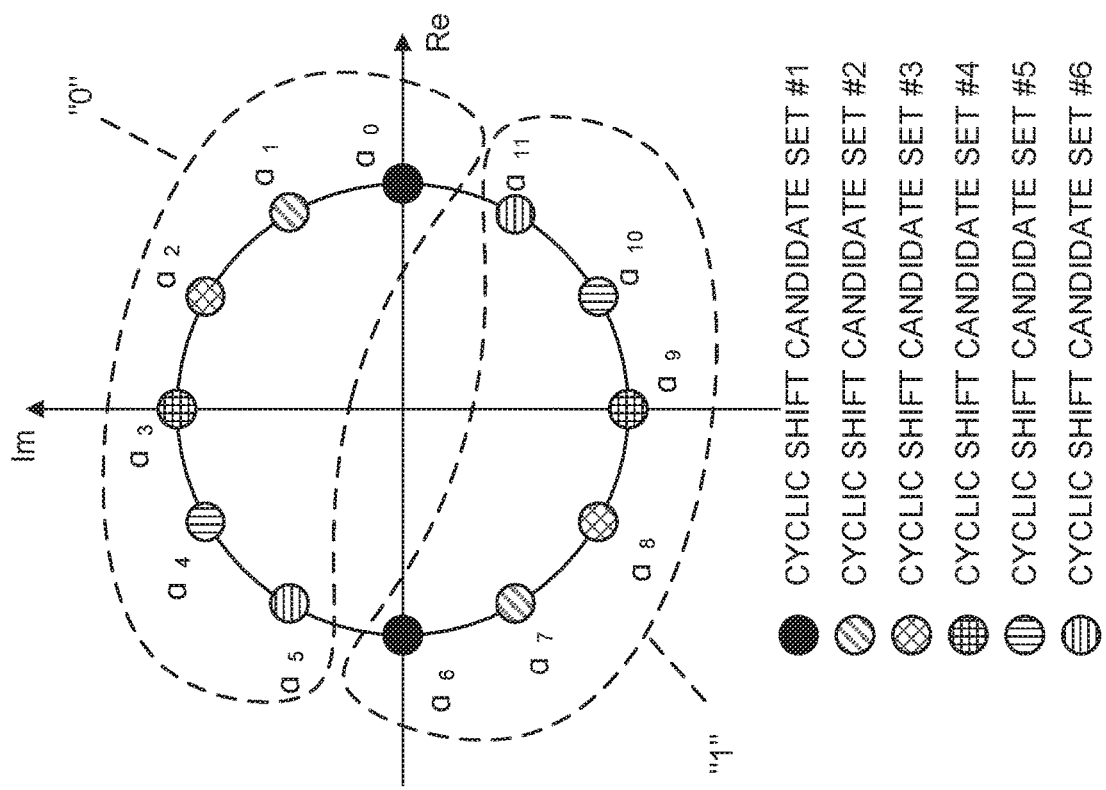

When UCI is comprised of 2 bits, as shown in FIG. 14B, a cyclic shift candidate set may contain 4 phase rotation amounts at regular intervals of $\pi/2$. In this case, 3 cyclic shift candidate sets are available for use.

A cyclic shift candidate set index may be assigned to each of multiple cyclic shift candidate sets, and the NW may report the cyclic shift candidate sets to the UE using the cyclic shift candidate set indices.

Figure 15B:
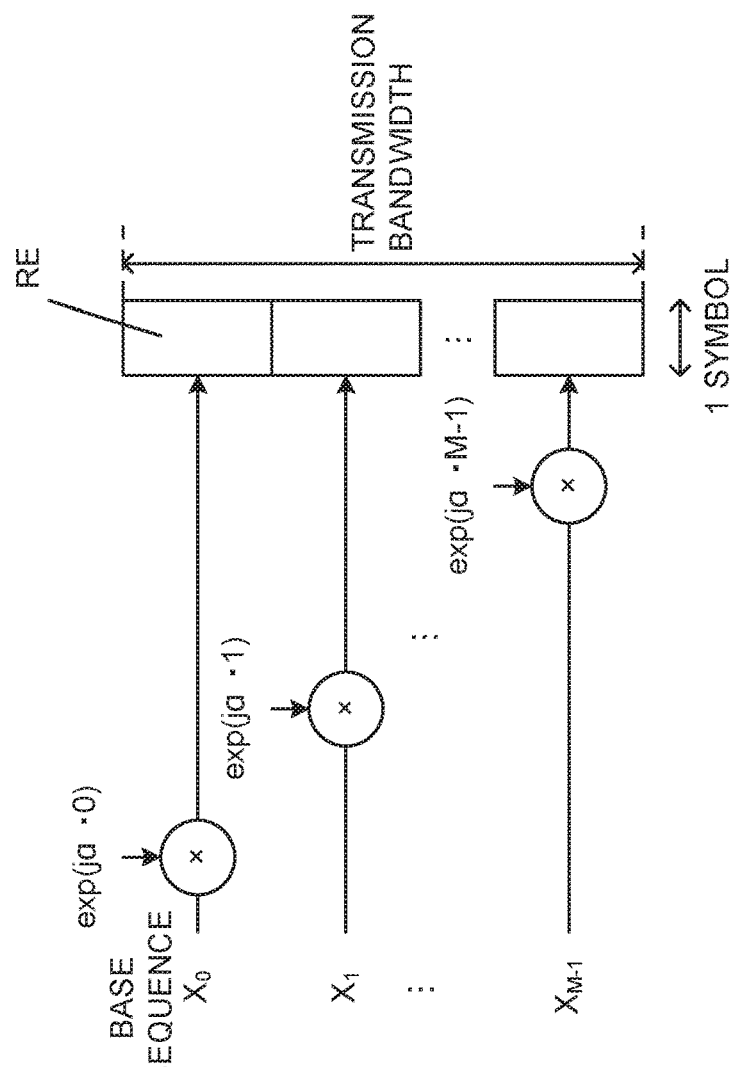
FIGS. 15A and 15B are diagrams to show examples of cyclic shifts using cyclic shift candidate sets provided at regular intervals.
Figure 15A:
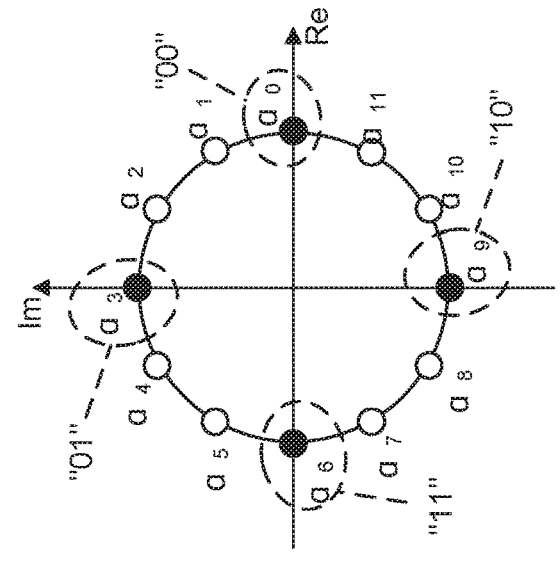

As shown in FIG. 15A, when UCI is comprised of 2 bits and the phase rotation amounts $\alpha_m$ included in a cyclic shift candidate set are comprised of $\alpha_0$, $\alpha_3$, $\alpha_6$ and $\alpha_9$ (m is 0, 3, 6 and 9), then, as shown in FIG. 15B, no matter which amount of phase rotation $\alpha_m$ in the cyclic shift candidate set is used, the same cyclic shift is applied to specific REs, which are provided every 4 REs (resource elements, subcarriers, etc.), and these specific REs are transmitted, so that the same value is transmitted. The NW may detect positive/negative SR based on a specific RE, perform channel estimation using a specific RE as a DMRS, or estimate noise variance based on a specific RE.

The amount of phase rotation (in the time domain, the amount of cyclic shift) for an RE whose RE number is a multiple of 4 is α×4m (m is an integer), so that the amount of phase rotation is 2πn (n is an integer) when α is 0, π/2, π and 3π/2, and the amount of phase rotation is always constant regardless of the value of a. Note that the cyclic shift candidate set may be comprised of $\alpha_1$, $\alpha_4$, $\alpha_7$ and $\alpha_{10}$, or may be comprised of $\alpha_2$, $\alpha_5$, $\alpha_8$ and $\alpha_{11}$. That is, the phase rotation amounts included in a cyclic shift candidate set have only to be provided at regular intervals. The gap between REs where the amount of phase rotation is an integral multiple of 2π may correspond to the number of candidate values (the number of cyclic shifts included in the cyclic shift candidate set) of UCI.

When UCI is comprised of 1 bit, a cyclic shift candidate set may contain 2 phase rotation amounts at regular intervals of π. In this case, the same cyclic shift is applied every 2 REs, and the same value is transmitted.

Figure 16:
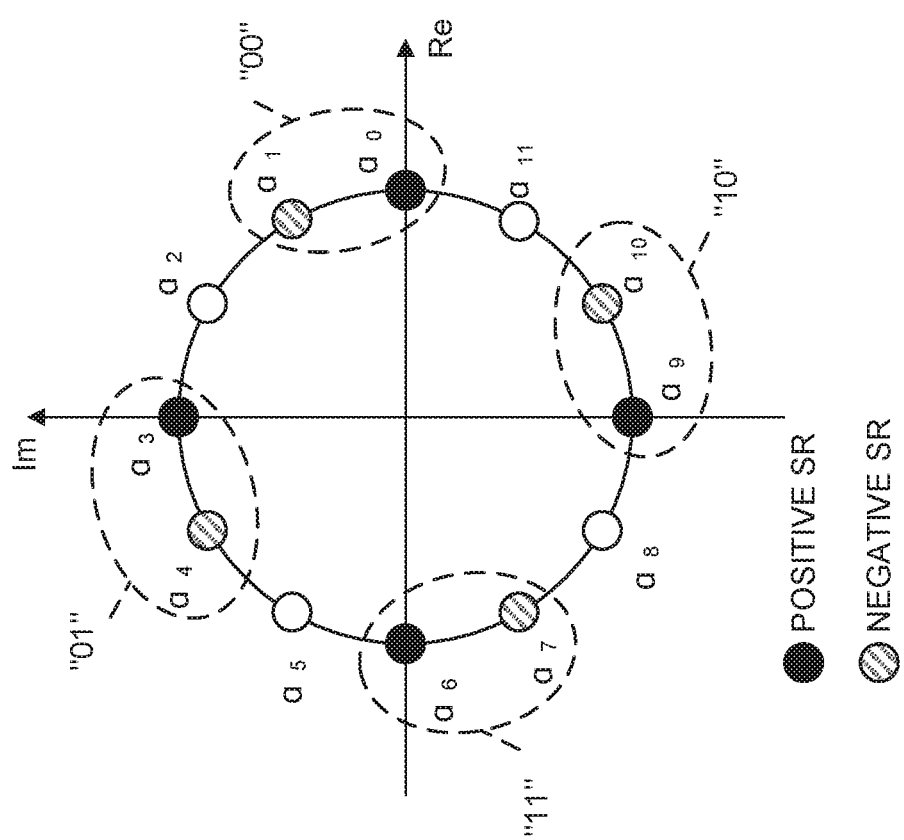
FIG. 16 is a diagram to show an example of cyclic shift candidate sets provided at regular intervals, corresponding to positive SRs and negative SRs.

Assume here that the sequence length of the base sequence is 12, and sequences produced by cyclic shifting are each transmitted in REs #0 to #11 in 1 PRB. If a sequence-based PUCCH reports 2-bits of UCI and positive/negative SR, for example, as shown in FIG. 16, $\alpha_0$, $\alpha_3$, $\alpha_6$ and $\alpha_9$ are assigned as a cyclic shift candidate set for positive SR, and $\alpha_1$, $\alpha_4$, $\alpha_6$ and $\alpha_{10}$ are assigned as a cyclic shift candidate set for negative SR.

4 patterns of transmission signal sequence candidates corresponding to the 4 values of UCI in the event of positive SR shown in FIG. 17A, and 4 patterns of transmission signal sequence candidates corresponding to the 4 values of UCI in the event of negative SR shown in FIG. 17B may be transmitted to report 2-bit UCI values and positive/negative SR. In FIGS. 17A and 17B, the row number corresponds to the index of the amount of phase rotation a (cyclic shift index) for each UCI value, and the column number corresponds to the RE index (subcarrier index, frequency index, etc.). The base sequence here is the CG-CAZAC sequence (u=0 and v=0) given in Table 5.5.1.2-1 of 3GPP TS 36.211 5.5.1.2.

The value of RE #0 is the same throughout the 8 patterns of transmission signal sequence candidates.

As shown in FIG. 17A, through 4 patterns of transmission signal sequence candidates ($\alpha_0$, $\alpha_3$, $\alpha_6$ and $\alpha_9$) for positive SR, the value of RE #0 is the same value p (0 and 0), the value of RE #4 is the same value p (0 and 1), and the value of RE #8 is the same value p (0 and 2). As shown in FIG. 17B, through 4 patterns of transmission signal sequence candidates ($\alpha_1$, $\alpha_4$, $\alpha_6$ and $\alpha_{10}$) for negative SR, the value of RE #0 is the same value p (1 and 0), the value of RE #4 is the same value p (1 and 1), and the value of RE #8 is the same value p (1 and 2).

The NW may assume that the same value is transmitted in REs #0, #4 and #8, regardless of the value of UCI, and that different values are sent for positive SR and negative SR. The NW generates transmission signal replicas of REs #0, #4 and #8 of positive SR (p' (0, 0), p' (0, 1) and p' (0, 2)) and transmission signal replicas of REs #0, #4 and #8 of negative SR (p' (1, 0), p' (1, 1) and p' (1, 2)). The NW can detect positive/negative SR by detecting the correlation between the received signals of REs #0, #4 and #8 (y (0), y (4) and y (8)) and the transmission signal replicas of REs #0, #4 and #8 (p' (0, 0), p' (0, 1) and p' (0, 2)) or (p' (1, 0), p' (1, 1) and p' (1, 2)). This operation may be rephrased as calculating the likelihood of the received signals of REs #0, #4 and #8 and the transmission signal replicas of REs #0, #4 and #8, and conducting MLD detection.

The NW may detect positive/negative SR based on 2 patterns of MLD, perform 4 patterns of MLD depending on the result of detection, and demodulate the UCI.

In addition, the NW may perform 8 patterns of MLD to demodulate the UCI value and positive/negative SR. Also, if the phase rotation amounts in a cyclic shift candidate set are not provided at regular intervals, it may be possible to perform MLD in 8 patterns to demodulate 3 bits, which combines 2 bits of UCI, and positive/negative SR. When performing MLD in 4 patterns after 2 patterns of MLD, the demodulation in the receiver of the NW can be simplified compared to when MLD is conducted in 8 patterns, so that the speed of demodulation can be improved.

The NW may assume that the same value is transmitted in REs #0, #4 and #8. In other words, the NW can assume that the transmission signals of REs #0, #4 and #8 are known in advance. Therefore, the NW may estimate the channels of REs #0 to #11 by using the received signals of REs #0, #4 and #8, estimate the transmission signals of REs #1, #2, #3, #5, #6, #7, #9, #10 and #11 based on the results of channel estimation, and estimate the cyclic shift amounts from the estimation results of the transmission signals, thereby decoding UCI.

2 patterns of MLD are performed to detect positive/negative SR and no MLD is used to demodulate UCI, so that the demodulation in the NW receiver can be simplified significantly.

Also, the NW can identify the channels and/or noise of REs #0, #4 and #8, by using the received signals of REs #0, #4 and #8 and the transmission signals of REs #0, #4 and #8 that are known in advance. The NW may estimate the transmission signals of REs #1, #2, #3, #5, #6, #7, #9, #10 and #11 by finding the simple average of identified channels in a PRB, or estimate the transmission signals of REs #1, #2, #3, #5, #6, #7, #9, #10 and #11 by MMSE (Minimum Mean Square Error) channel estimation. However, MMSE channel estimation requires estimating the variance of noise.

The NW may assume that the same value is transmitted in REs #0, #4 and #8, regardless of the value of UCI, and that different values are sent for positive SR and negative SR. In other words, the NW can assume that the transmission signals of REs #0, #4 and #8 are known in advance. Consequently, the NW may estimate the variance of noise by monitoring the received signals of REs #0, #4 and #8 over multiple symbols or multiple subframes. The NW may perform DTX (discontinuous reception) detection based on the result of noise variance estimation and find out that no signal is transmitted. The NW can estimate the variance of noise without the need for known signals other than sequence-based PUCCHs.

According to this embodiment, a number of phase rotation amounts are provided in a cyclic shift candidate set, at regular intervals, so that a UL signal that is transmitted in a specific subcarrier (RE) has the same value for all of multiple candidate values of UCI. Consequently, the NW can perform the receiving operation by using this UL signal as a known signal, so that the receiving operation can be made efficient, and, without transmitting separate known signals, sequence-based PUCCHs can be used to make the same estimation as when known signals are used.

Fifth Embodiment

With a fifth embodiment of the present invention, cyclic shift candidate sets are reported implicitly. The time/frequency resources are reported explicitly.

Note that, even if a sequence-based PUCCH does not report positive SR and/or negative SR, the method of reporting cyclic shift candidate sets according to embodiments of the present invention can be applied.

For example, UE may identify a cyclic shift candidate set for a sequence-based PUCCH based on a CCE (Control Channel Element) index of the PDCCH. This CCE index may be the minimum value or the maximum value of the CCE indices of the PDCCH. This PDCCH may indicate the allocation of PUCCH resources, or indicate the allocation of PUSCH resources.

«Selection Method Based on Remainder of CCE Index»

The UE may select the cyclic shift candidate set based on the remainder of the number of cyclic shift candidate sets in the CCE index.

Assume that, for example, UCI has 2 bits, and the UE can use 3 cyclic shift candidate sets, as shown in FIG. 14B. In this case, the UE may select the cyclic shift candidate set based on the number/value of the remainder of the CCE index divided by 3.

Here, the first SR reporting method will be used. That is, it is possible to assume that frequency resources for positive SR are different from frequency resources for negative SR, and reported explicitly or implicitly. Provided that 3 cyclic shift candidate sets are assigned to the UE, it is difficult to use the second SR reporting method.

As shown in FIG. 18A, if a CCE index divided by 3 gives a remainder of 0, the UE determines that the cyclic shift candidate set number for negative SR is 1. As shown in FIG. 18B, if a CCE index divided by 3 gives a remainder of 1, the UE determines that the cyclic shift candidate set number for negative SR is 2. As shown in FIG. 18C, if a CCE index divided by 3 gives a remainder of 2, the UE determines that the cyclic shift candidate set number for negative SR is 3.

For example, the UE may determine the cyclic shift candidate set for positive SR from the cyclic shift candidate set for negative SR by using one of cyclic shift candidate set allocation patterns #1 to #3 according to the second embodiment. For example, when, as shown in FIG. 10, the cyclic shift candidate set number for positive SR is "the cyclic shift candidate set number for negative SR+1," as shown in FIGS. 18A to 18C, the UE determines the cyclic shift candidate set number for positive SR. For example, the UE may assume that the cyclic shift candidate set for positive SR and the cyclic shift candidate set for negative SR are equal.

Assume that, for example, UCI is 1 bit, and the UE can use 6 cyclic shift candidate sets, as shown in FIG. 14A. In this case, the UE may select the cyclic shift candidate set based on the number/value of the remainder of the CCE index divided by 6.

«Selection Method Based on Remainder of CCE Index»

The UE may select a cyclic shift candidate set based on whether the CCE index is an odd number or an even number.

For example, when UCI has 2 bits, the UE can use 3 cyclic shift candidate sets, as shown in FIG. 14B. In this case, if the CCE index is an odd number, the UE may use cyclic shift candidate set #1, and, if the CCE index is an even number, the UE may use cyclic shift candidate set #2.

Figure 19A:
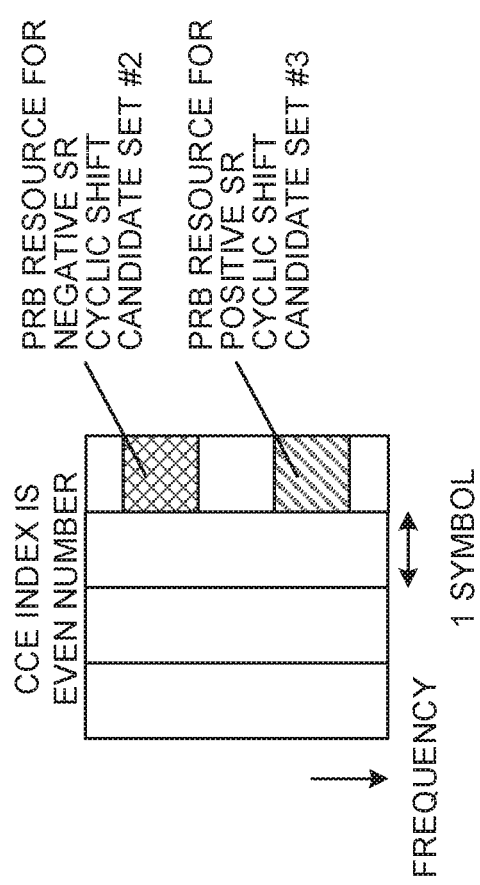
FIGS. 19A and 19B are diagrams to show examples of selection methods based on whether the CCE index is an odd number or an even number.

If the CCE index is an odd number, as shown in FIG. 19A, the UE may use the second SR reporting method. In this case, the UE may assume that cyclic shift candidate set allocation pattern #1 is the cyclic shift candidate set for negative SR and that cyclic shift candidate set allocation pattern #2 is the cyclic shift candidate set for positive SR.

Figure 19B:
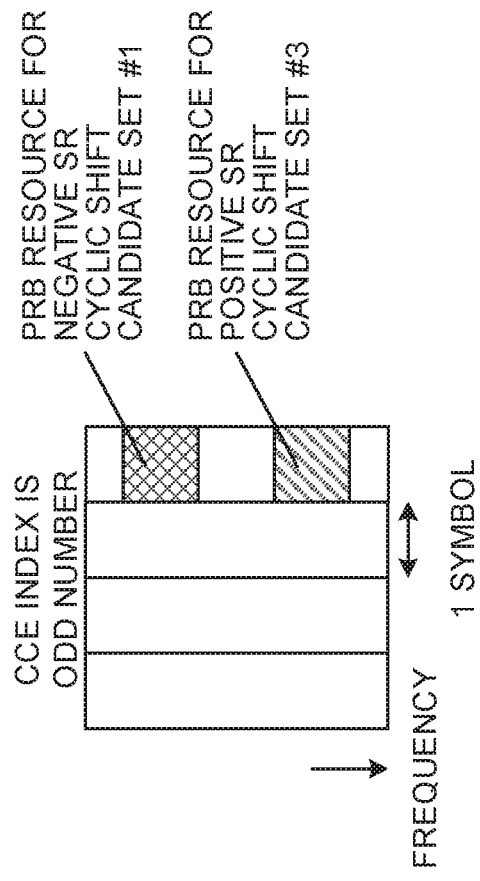

If the CCE index is an even number, as shown in FIG. 19B, the UE may use the first SR reporting method. In this case, the UE may assume that cyclic shift candidate set allocation pattern #2 is the cyclic shift candidate set for negative SR and that cyclic shift candidate set allocation pattern #2 is the cyclic shift candidate set for positive SR. The frequency resource for positive SR may be selected by using any one of the methods according to the second embodiment.

The UE may use cyclic shift candidate set #1 as a cyclic shift candidate set for negative SR when the CCE index is an odd number, or use cyclic shift candidate set #2 if the CCE index is an even number, and use cyclic shift candidate set #3 as a cyclic shift candidate set for positive SR regardless of the CCE index. In this case, the UE may use the second SR reporting method if the CCE index is an odd number, and use the first SR reporting method if the CCE index is an even number.

Given that cyclic shift candidate set #1 or #2 is the cyclic shift candidate set for negative SR, using cyclic shift candidate set #3 as a cyclic shift candidate set for positive SR makes it possible to avoid contention with cyclic shift candidate sets that are already assigned.

Note that, the operation when the CCE index is an odd number and the operation when the CCE index is an even number may be reversed.

«Selection Based on Parameters Other than CCE Index»

The UE may select a cyclic shift candidate set based on any one of the PDCCH format, the number of CCEs, the aggregation level, the number of REGs (Resource Element Groups), and the number of PDCCH bits, as shown in FIG. 20, instead of using CCE indices. FIG. 20 is based on 3GPP TS 36.211 Table 6.8.1-1.

The UE may use the PUCCH format type instead of the remainder given by dividing the CCE index by the number of cyclic shift candidate sets, which has been described earlier. When UCI is comprised of 1 bit and cyclic shift candidate sets #1 to #6 are available for use, PDCCH formats 0, 1, 2 and 3 may be associated with cyclic shift candidate sets #1, #2, #3, and #4, respectively. When UCI is comprised of 2 bits and cyclic shift candidate sets #1 to #3 are available for use, PDCCH formats 0, 1, 2 and 3 may be associated with cyclic shift candidate sets #1, #2, #3, and #3, respectively. For example, the UE may select a cyclic shift candidate set that is associated with a PDCCH format as a cyclic shift candidate set for negative SR.

Aggregation levels 1 and 2 may be associated with the above-described second SR reporting method and cyclic shift candidate sets for use when the CCE index is an odd number, and aggregation levels 3 and 4 may be associated with the above-described first SR reporting method and cyclic shift candidate sets for use when the CCE index is an even number. For example, the UE may use the SR reporting method and the cyclic shift candidate set associated with the aggregation level.

According to this embodiment, the UE can select a cyclic shift candidate set for a sequence-based PUCCH and/or the SR reporting method based on a PDCCH that is received. It is therefore possible to reduce the amount of information to report from the NW to the UE.

(Radio Communication System)

Now, the structure of a radio communication system according to one embodiment of the present invention will be described below. In this radio communication system, communication is performed using one of the radio communication methods according to the herein-contained embodiments of the present invention, or a combination of these.

Figure 21:
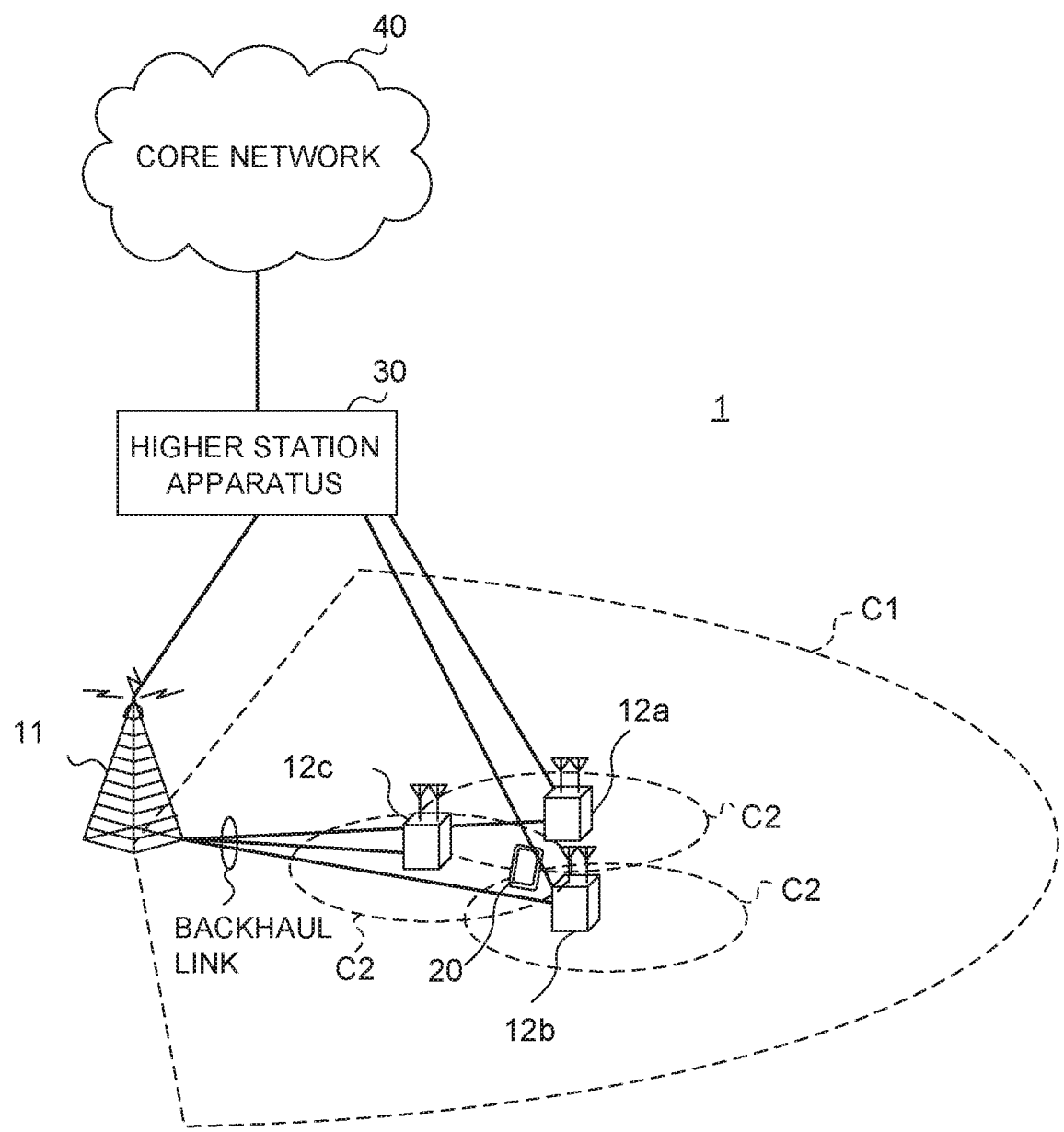
FIG. 21 is a diagram to show an exemplary schematic structure of a radio communication system according to one embodiment of the present invention.

FIG. 21 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement and the number of cells and user terminals 20 are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

The radio base station 11 and a radio base station 12 (or 2 radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or more contiguous resource blocks per terminal, and allowing a plurality of terminals to use mutually different bands. Note that uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," and so forth) in response to the PUSCH is communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 22:
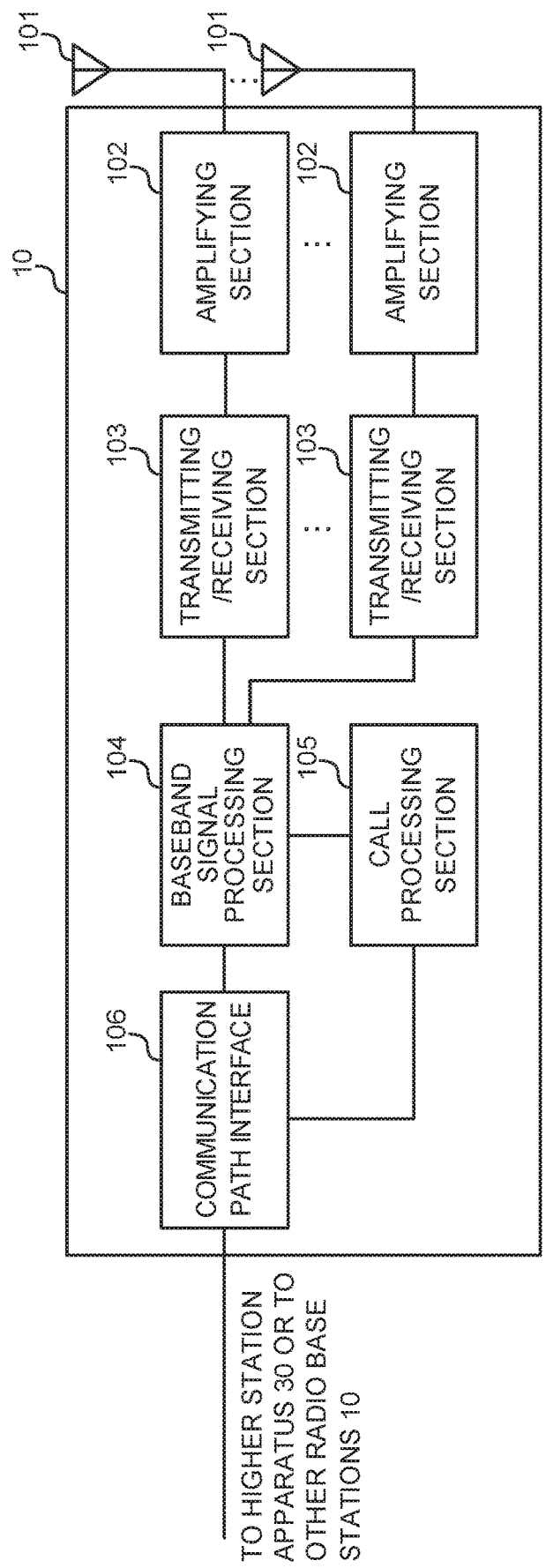
FIG. 22 is a diagram to show an exemplary overall structure of a radio base station according to one embodiment of the present invention.

FIG. 22 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Also, the transmitting/receiving sections 103 may receive a UL signal (for example, a sequence-based PUCCH) that contains UL control information (UCI) and/or a scheduling request (SR).

Also, the transmitting/receiving sections 103 may transmit candidate set information that shows a number of phase rotation amounts (for example, a cyclic shift candidate set) that are respectively associated with multiple candidate values of UCI. Also, the transmitting/receiving sections 103 may receive a UL signal (for example, a sequence-based PUCCH) that is transmitted by using an amount of phase rotation that is associated with a UCI value, based on candidate set information.

Figure 23:
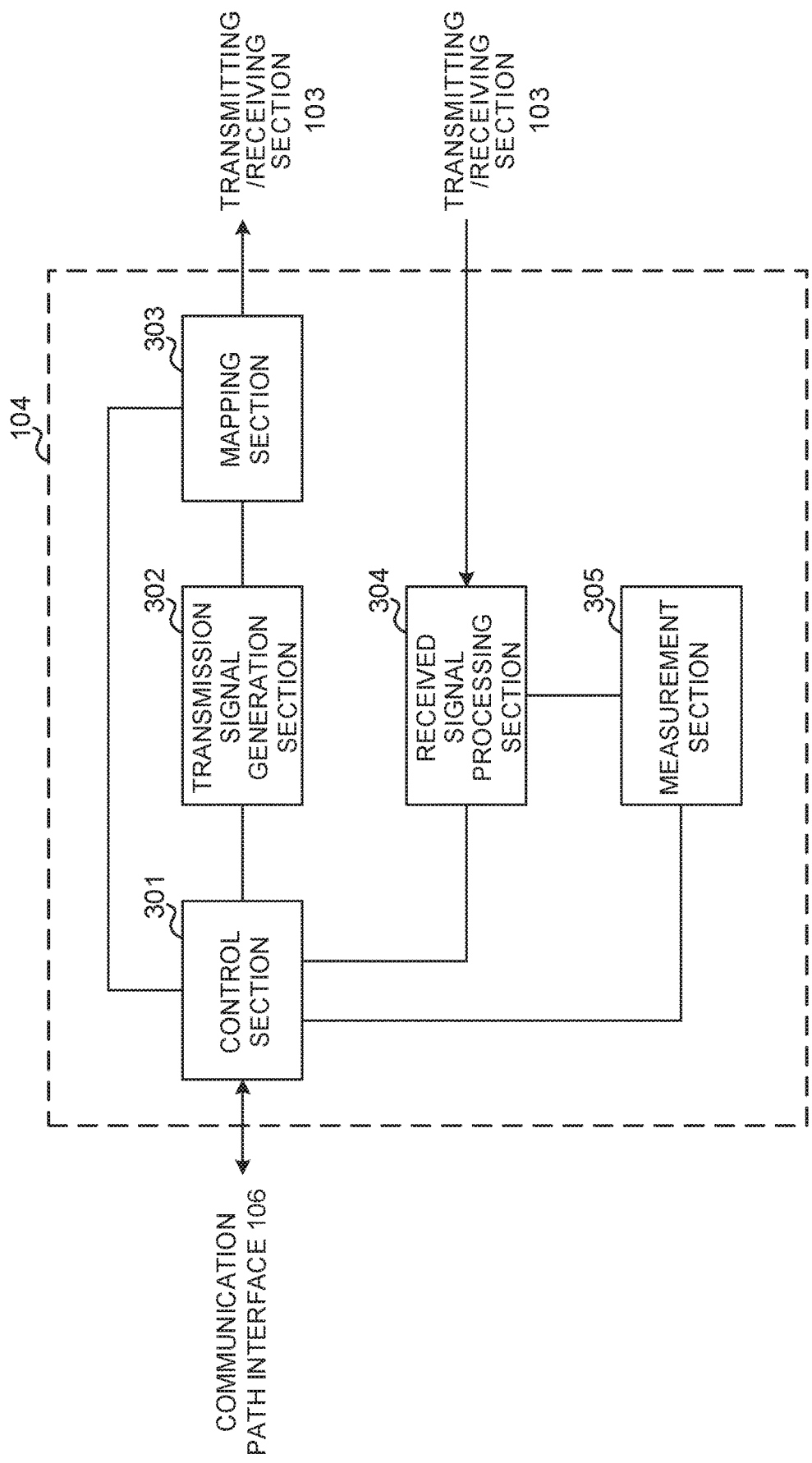
FIG. 23 is a diagram to show an exemplary functional structure of a radio base station according to one embodiment of the present invention.

FIG. 23 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 controls scheduling of uplink data signals (for example, signals transmitted in the PUCCH), uplink control signal (for example, signals transmitted in the PUCCH and/or the PUSCH, such as delivery acknowledgment information), random access preambles (for example, signal transmitted in the PUSCH), uplink reference signals, and so on.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the information that is decoded through receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI) and so on. The measurement results may be output to the control section 301.

Also, the control section 301 may allocate radio resources for UL control information (UCI).

In addition, the control section 301 may allocate radio resources in response to scheduling requests (SRs) from the user terminal 20.

Also, the control section 301 may control the judgement of UCI values based on UL signals (for example, sequence-based PUCCHs). A number of phase rotation amounts may be provided at regular intervals.

Also, the control section 301 may judge whether or not UCI contains a scheduling request based on a UL signal that is received in a specific subcarrier (RE).

Also, the control section 301 may perform channel estimation based on a UL signal received in a specific subcarrier, and judge the UCI value based on the result of channel estimation.

Also, the control section 301 may estimate noise variance based on a UL signal received in a specific subcarrier.

Also, the UL signal transmitted in a specific subcarrier may be the same value for all of multiple candidate values.

(User Terminal)

Figure 24:
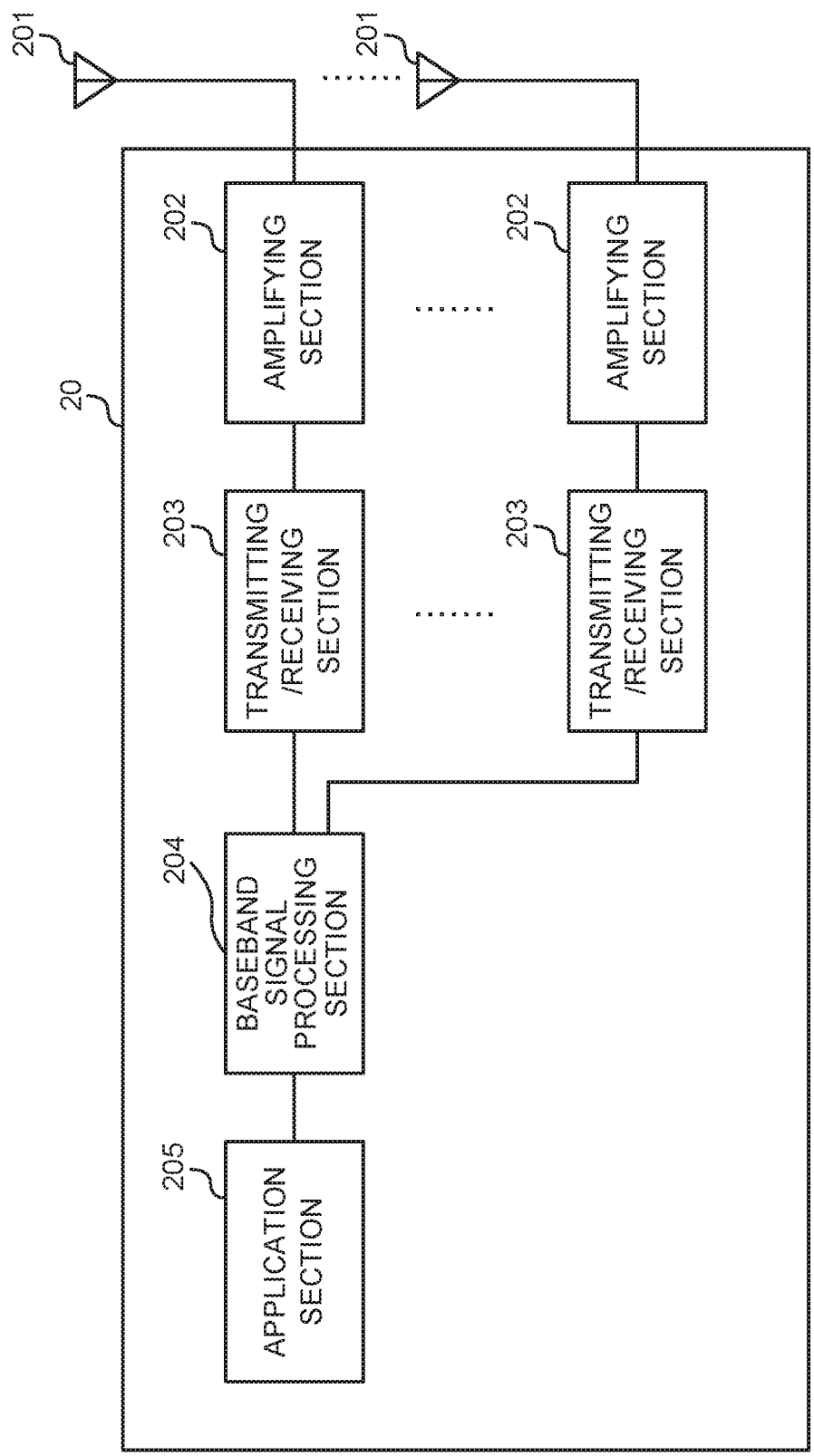
FIG. 24 is a diagram to show an exemplary overall structure of a user terminal according to one embodiment of the present invention.

FIG. 24 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may transmit a UL signal (for example, a sequence-based PUCCH) that contains UL control information (UCI) and/or a scheduling request (SR).

Also, the transmitting/receiving section 203 may transmit UCI containing an SR (scheduling request) or UCI not containing an SR.

Also, when different frequency resources (for example, PRBs) are allocated to UCI containing an SR and UCI not containing an SR, the transmitting/receiving sections 203 may transmit UCI containing an SR and UCI not containing an SR, respectively, by using corresponding frequency resources.

Also, if the same frequency resource is allocated to UCI containing an SR and UCI not containing an SR, different code resources may be allocated to UCI containing an SR and UCI not containing an SR, and the transmitting/receiving sections 203 may transmit the UCI containing an SR and the UCI not containing an SR by using corresponding code resources.

Figure 25:
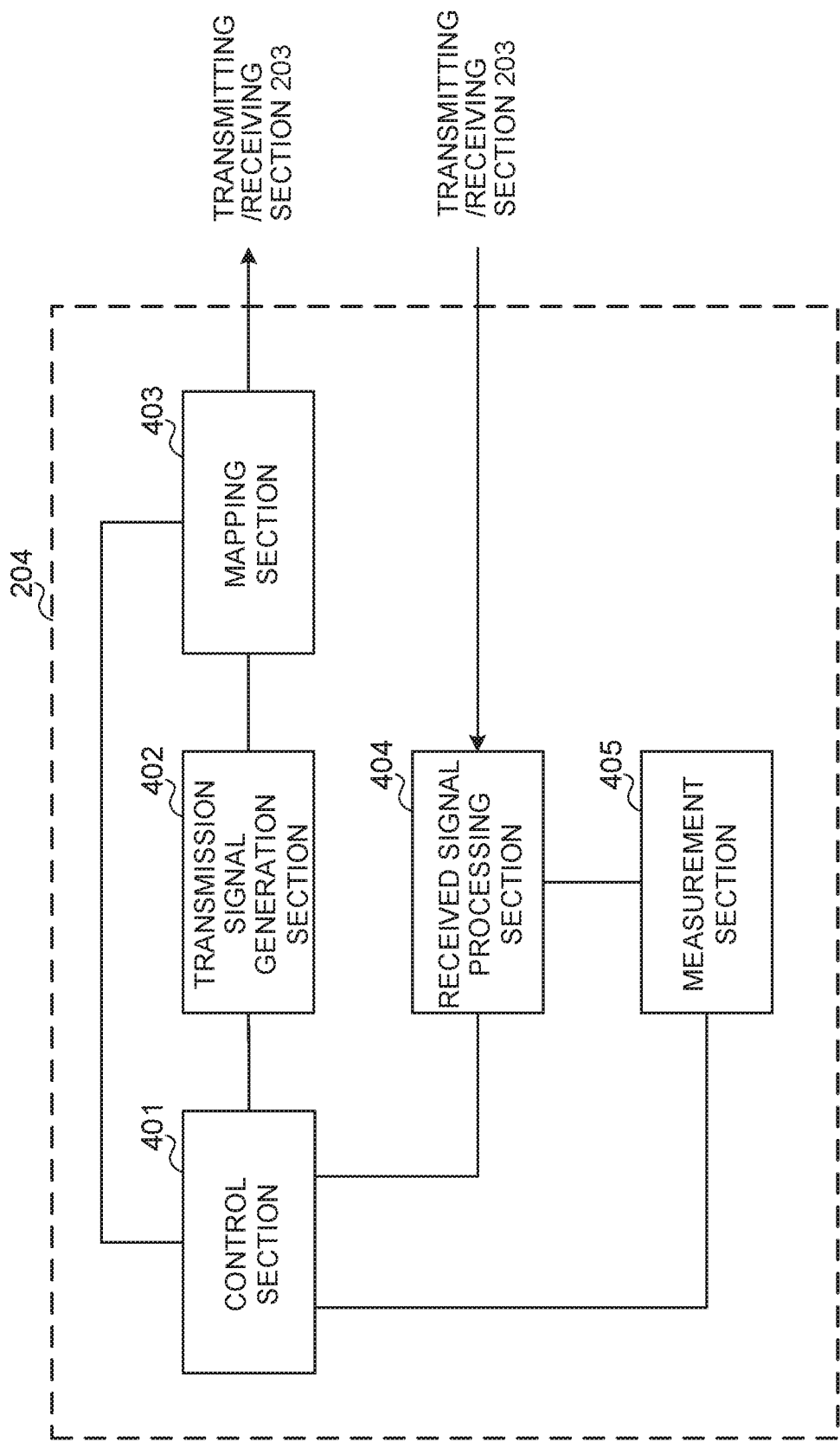
FIG. 25 is a diagram to show an exemplary functional structure of a user terminal according to one embodiment of the present invention.

FIG. 25 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the information that is decoded through receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI) and so on. The measurement results may be output to the control section 401.

The control section 401 may also control UCI transmission based on whether different frequency resources (for example, PRBs) are allocated to UCI containing an SR and UCI not containing an SR.

Also, if the frequency resource allocated to one of UCI containing an SR and UCI not containing an SR is reported, the control section 401 may identify the frequency resource allocated to the other one based on the frequency resource reported.

Also, when the same frequency resource is allocated to UCI containing an SR and UCI not containing an SR, and the code resource allocated to one of the UCI containing an SR and the UCI not containing an SR is reported, the control section 401 may identify the frequency resource allocated to the other one based on the code resource reported.

Also, a plurality of candidate values of UCI may be associated, respectively, with a number of phase rotation amounts provided at regular intervals.

Also, whether or not different frequency resources (for example, PRBs) are allocated to UCI containing an SR and UCI not containing an SR may be associated with a PDCCH parameter. The parameter may be one of the CCE index, the PDCCH format, the number of CCEs, the aggregation level, the number of REGs, and the number of PDCCH bits.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 26:
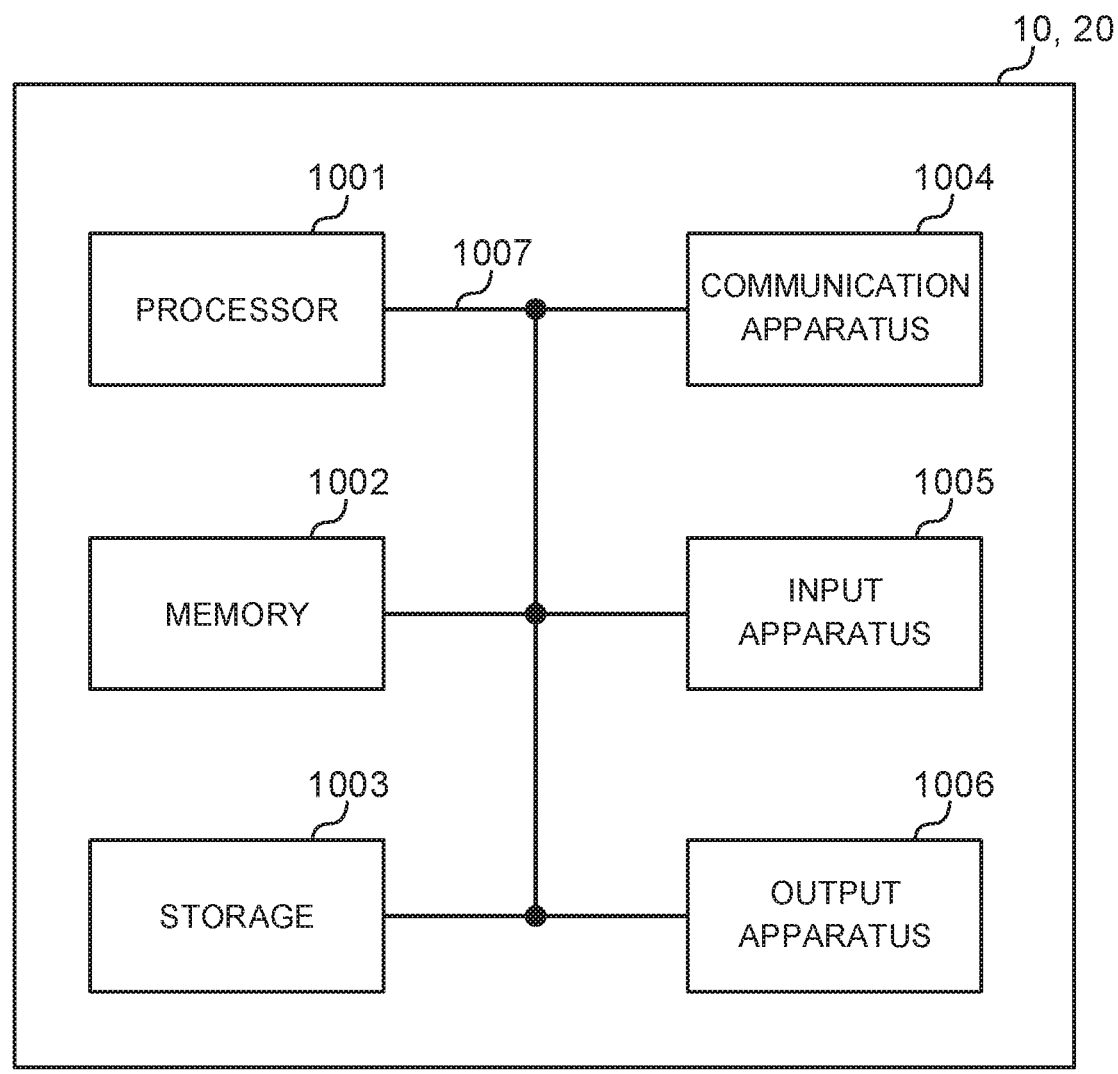
FIG. 26 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 26 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read given software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "mini-slot," a "sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent in an implicit way (for example, by not reporting this piece of information, by reporting another piece of information, and so on). Decisions may be made in values represented by 1 bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a processor that determines a cyclic shift based on Hybrid Automatic Repeat reQuest-Acknowledgement (HARQ-ACK) information and a minimum index of control channel elements (CCEs) of a received downlink control channel; and
   a transmitter that transmits a sequence based on the cyclic shift in an uplink control channel,
   wherein the processor determines a time resource of the uplink control channel among a plurality of time resources based on a higher layer signaling, and
   wherein the processor determines a cyclic shift index based on a remainder obtained by dividing an index based on the downlink control channel by a number of candidates of the cyclic shift index, and determines the cyclic shift based on the cyclic shift index.

2. The terminal according to claim 1, wherein the higher layer signaling is a system information block.

3. The terminal according to claim 2, wherein when the HARQ-ACK information is 1 bit, the cyclic shift is one of two possible cyclic shifts that are respectively based on two possible values of the HARQ-ACK information and an interval between the two possible cyclic shifts is equal to $\pi$.

4. The terminal according to claim 1, wherein when the HARQ-ACK information is 1 bit, the cyclic shift is one of two possible cyclic shifts that are respectively based on two possible values of the HARQ-ACK information and an interval between the two possible cyclic shifts is equal to $\pi$.

5. The terminal according to claim 1, wherein the processor determines the cyclic shift based on the HARQ-ACK information and whether the minimum index is an odd number or an even number.

6. A radio communication method for a terminal comprising:
   determining a cyclic shift based on Hybrid Automatic Repeat reQuest-Acknowledgement (HARQ-ACK) information and a minimum index of control channel elements (CCEs) of a received downlink control channel; and
   transmitting a sequence based on the cyclic shift in an uplink control channel, wherein the terminal determines a time resource of the uplink control channel among a plurality of time resources based on a higher layer signaling, and wherein the terminal determines a cyclic shift index based on a remainder obtained by dividing an index based on the downlink control channel by a number of candidates of the cyclic shift index, and determines the cyclic shift based on the cyclic shift index.

7. A system comprising:

a terminal that comprises:

a processor that determines a cyclic shift based on Hybrid Automatic Repeat reQuest-Acknowledgement (HARQ-ACK) information and a minimum index of control channel elements (CCEs) of a received downlink control channel; and a transmitter that transmits a sequence based on the cyclic shift in an uplink control channel, wherein the processor determines a cyclic shift index based on a remainder obtained by dividing an index based on the downlink control channel by a number of candidates of the cyclic shift index, and determines the cyclic shift based on the cyclic shift index; and a base station that receives the sequence in the uplink control channel, wherein the processor determines a time resource of the uplink control channel among a plurality of time resources based on a higher layer signaling.

\* \* \* \* \*